(12) United States Patent
Pemble et al.

(10) Patent No.: US 7,925,320 B2
(45) Date of Patent: Apr. 12, 2011

(54) ELECTRONIC DEVICE MOUNT

(75) Inventors: Clifton A. Pemble, Overland Park, KS (US); Warren R. Stevens, Olathe, KS (US); Michael R. Wiegers, Paola, KS (US)

(73) Assignee: Garmin Switzerland GmbH (CH)

( * ) Notice: Subject to any disclaimer, the term of this patent is extended or adjusted under 35 U.S.C. 154(b) by 1190 days.

(21) Appl. No.: 11/369,032

(22) Filed: Mar. 6, 2006

(65) Prior Publication Data

US 2007/0207842 A1 Sep. 6, 2007

(51) Int. Cl.
*H04M 1/00* (2006.01)

(52) U.S. Cl. ............... 455/575.9; 455/550.1; 455/556.1; 455/557

(58) Field of Classification Search .................... 455/88, 455/90.3, 550.1, 556.1, 557, 575.1, 575.9, 455/569.2
See application file for complete search history.

(56) References Cited

U.S. PATENT DOCUMENTS

| | | | | |
|---|---|---|---|---|
| 1,398,483 A | 11/1921 | Curtis | ........................... | 24/710.7 |
| 2,508,076 A | 5/1950 | Palmer | ............................. | 33/410 |
| 2,792,932 A | 5/1957 | Friestat | ........................ | 206/314 |
| 2,958,760 A | 11/1960 | McNally | ....................... | 362/275 |
| 3,040,900 A | 6/1962 | Jones | ............................. | 211/35 |
| 3,063,048 A | 11/1962 | Lehan et al. | | |
| 3,509,882 A | 5/1970 | Blake | ............................. | 606/142 |
| 3,660,812 A | 5/1972 | Inose et al. | | |
| 3,883,847 A | 5/1975 | Frank | | |
| 4,021,807 A | 5/1977 | Culpepper et al. | ............ | 343/112 |
| 4,131,849 A | 12/1978 | Freeburg et al. | .............. | 375/216 |
| 4,296,408 A | 10/1981 | Neuringer | ................ | 340/539.13 |
| 4,323,992 A | 4/1982 | Tobin, Jr. | ...................... | 367/108 |
| 4,445,118 A | 4/1984 | Taylor et al. | | |
| 4,459,667 A | 7/1984 | Takeuchi | ....................... | 364/424 |
| 4,475,010 A | 10/1984 | Huensch et al. | .................. | 179/2 |
| 4,536,926 A | 8/1985 | Pantaleo | ......................... | 24/523 |
| 4,583,269 A | 4/1986 | Harris | .............................. | 24/495 |
| 4,593,273 A | 6/1986 | Narcisse | ........................ | 340/539 |
| 4,625,526 A | 12/1986 | Milawski | ........................ | 63/14.1 |
| 4,642,775 A | 2/1987 | Cline et al. | ..................... | 701/200 |
| 4,651,157 A | 3/1987 | Gray et al. | ..................... | 342/457 |
| 4,675,656 A | 6/1987 | Narcisse | ........................ | 340/359 |

(Continued)

FOREIGN PATENT DOCUMENTS

AT 209809 T 12/2002

(Continued)

OTHER PUBLICATIONS

U.S. Appl. No. 10/032,250, filed Dec. 21, 2001, Childs et al.

(Continued)

*Primary Examiner* — Tuan H Nguyen
(74) *Attorney, Agent, or Firm* — Samuel M. Korte

(57) ABSTRACT

Embodiments of the present invention provide an electronic device mount (10) operable to provide navigation information to an electronic device (D). The mount (10) generally includes a housing (12) operable to securely retain the electronic device (D) and removably couple with a surface. The housing (12) preferably encloses or supports various portions of an antenna (14), a processor (18), and/or a transmitter (16). The antenna (14) is operable to receive a navigation signal, the processor (18) is operable to generate navigation information utilizing the received navigation signal, and the transmitter (16) operable to wirelessly transmit the generated navigation information to the electronic device (D). Such a configuration enables the electronic device (D) to receive navigation information from the mount (10) while being compactly and securely retained.

18 Claims, 10 Drawing Sheets

U.S. PATENT DOCUMENTS

| | | | |
|---|---|---|---|
| D291,288 S | 8/1987 | Suzuki | D10/78 |
| 4,750,197 A | 6/1988 | Denekamp et al. | 379/58 |
| 4,809,005 A | 2/1989 | Counselman, III | 342/352 |
| 4,811,613 A | 3/1989 | Phillips et al. | |
| 4,827,419 A | 5/1989 | Selby | |
| 4,831,563 A | 5/1989 | Ando et al. | |
| D301,882 S | 6/1989 | Watanabe | D14/140 |
| D302,271 S | 7/1989 | Watanabe | D14/140 |
| 4,884,132 A | 11/1989 | Morris et al. | |
| 4,891,650 A | 1/1990 | Sheffer | 342/457 |
| 4,907,290 A | 3/1990 | Crompton | 455/56 |
| 4,912,756 A | 3/1990 | Hop | 379/60 |
| 4,924,402 A | 5/1990 | Ando et al. | |
| 4,926,336 A | 5/1990 | Yamada | |
| 4,937,753 A | 6/1990 | Yamada | |
| 4,953,198 A | 8/1990 | Daly et al. | 379/61 |
| 4,957,510 A | 9/1990 | Cremascoli | |
| 4,972,479 A | 11/1990 | Tobias, Jr. et al. | 380/33 |
| D312,650 S | 12/1990 | Charrier | D16/242 |
| 4,977,399 A | 12/1990 | Price et al. | 340/825.44 |
| D314,713 S | 2/1991 | Ciranny et al. | D10/65 |
| 5,021,794 A | 6/1991 | Lawrence | 342/457 |
| 5,043,736 A | 8/1991 | Darnell et al. | |
| 5,055,851 A | 10/1991 | Sheffer | 342/457 |
| 5,072,209 A | 12/1991 | Hori et al. | 340/432 |
| D326,450 S | 5/1992 | Watanabe | D14/138 |
| 5,119,504 A | 6/1992 | Durboraw, III | |
| 5,144,323 A | 9/1992 | Yonkers | 342/386 |
| 5,146,231 A | 9/1992 | Ghaem et al. | 342/419 |
| 5,155,689 A | 10/1992 | Wortham | 364/460 |
| 5,172,110 A | 12/1992 | Tiefengraber | 340/825.49 |
| 5,187,744 A | 2/1993 | Richter | 379/449 |
| 5,193,215 A | 3/1993 | Oimers | 455/66 |
| 5,202,829 A | 4/1993 | Geier | 342/357.08 |
| 5,208,593 A | 5/1993 | Tong et al. | |
| 5,208,756 A | 5/1993 | Song | |
| 5,218,367 A | 6/1993 | Sheffer et al. | 342/457 |
| 5,219,067 A | 6/1993 | Lima et al. | 200/302.2 |
| 5,220,507 A | 6/1993 | Kirson | 701/202 |
| 5,220,509 A | 6/1993 | Takemura et al. | |
| 5,223,844 A | 6/1993 | Mansell et al. | |
| D337,582 S | 7/1993 | Lewo | D14/144 |
| 5,235,633 A | 8/1993 | Dennison et al. | |
| 5,243,529 A | 9/1993 | Kashiwazaki | |
| 5,245,314 A | 9/1993 | Kah, Jr. | 340/539 |
| 5,258,592 A | 11/1993 | Nishikawa et al. | 200/302.2 |
| 5,265,150 A | 11/1993 | Helmkamp et al. | 379/58 |
| 5,265,929 A | 11/1993 | Pelham | 296/97.6 |
| 5,272,638 A | 12/1993 | Martin et al. | |
| 5,289,195 A | 2/1994 | Inoue | 342/457 |
| 5,297,051 A | 3/1994 | Arakawa et al. | |
| 5,299,132 A | 3/1994 | Wortham | 364/460 |
| 5,301,368 A | 4/1994 | Hirata | |
| 5,305,381 A | 4/1994 | Wang et al. | 379/455 |
| 5,307,277 A | 4/1994 | Hirano | 364/449 |
| 5,315,636 A | 5/1994 | Patel | 379/58 |
| 5,323,164 A | 6/1994 | Endo | 342/357 |
| 5,327,144 A | 7/1994 | Stilp et al. | 342/387 |
| 5,331,563 A | 7/1994 | Masumoto et al. | |
| 5,334,799 A | 8/1994 | Naito et al. | 174/17 |
| 5,334,974 A | 8/1994 | Simms et al. | |
| 5,341,410 A | 8/1994 | Aron et al. | 379/59 |
| 5,343,399 A | 8/1994 | Yokoyama et al. | |
| 5,345,244 A | 9/1994 | Gildea et al. | |
| 5,349,530 A | 9/1994 | Odagawa | |
| D351,169 S | 10/1994 | Leung | D14/188 |
| 5,355,511 A | 10/1994 | Hatano et al. | |
| 5,361,212 A | 11/1994 | Class et al. | 364/428 |
| 5,363,306 A | 11/1994 | Kuwahara et al. | |
| 5,364,093 A | 11/1994 | Huston et al. | |
| 5,365,448 A | 11/1994 | Nobe et al. | |
| 5,365,450 A | 11/1994 | Schuchman et al. | |
| 5,371,497 A | 12/1994 | Nimura et al. | |
| 5,379,224 A | 1/1995 | Brown et al. | |
| 5,389,934 A | 2/1995 | Kass | |
| 5,396,430 A | 3/1995 | Arakawa et al. | |
| 5,408,238 A | 4/1995 | Smith | |
| 5,410,486 A | 4/1995 | Kishi | |
| 5,414,432 A | 5/1995 | Penny et al. | |
| 5,422,815 A | 6/1995 | Hijikata | |
| 5,422,816 A | 6/1995 | Sprague et al. | 455/556.2 |
| 5,424,953 A | 6/1995 | Masumoto et al. | |
| 5,434,789 A | 7/1995 | Fraker et al. | |
| 5,438,518 A | 8/1995 | Bianco et al. | 364/460 |
| 5,442,559 A | 8/1995 | Kuwahara et al. | |
| 5,448,773 A | 9/1995 | McBurney et al. | |
| 5,452,212 A | 9/1995 | Yokoyama et al. | |
| 5,452,217 A | 9/1995 | Kishi | |
| D363,488 S | 10/1995 | Shumaker | D14/230 |
| 5,463,554 A | 10/1995 | Araki et al. | |
| D364,164 S | 11/1995 | Hanig | D14/192 |
| 5,469,175 A | 11/1995 | Boman | |
| D365,032 S | 12/1995 | Laverick et al. | D10/78 |
| D365,292 S | 12/1995 | Laverick et al. | D10/78 |
| 5,475,599 A | 12/1995 | Yokoyama | |
| 5,493,309 A | 2/1996 | Bjornholt | 342/455 |
| 5,506,578 A | 4/1996 | Kishi | |
| 5,506,587 A | 4/1996 | Lans | |
| 5,506,774 A | 4/1996 | Nobe et al. | |
| 5,509,369 A | 4/1996 | Ford et al. | 114/150 |
| 5,513,183 A | 4/1996 | Kay et al. | 370/95.3 |
| 5,517,199 A | 5/1996 | DiMattei | 342/357.09 |
| 5,519,403 A | 5/1996 | Bickley et al. | 342/352 |
| 5,526,526 A | 6/1996 | Clark et al. | 455/90.3 |
| 5,528,248 A | 6/1996 | Steiner et al. | |
| 5,537,323 A | 7/1996 | Schulte | |
| 5,537,324 A | 7/1996 | Nimura et al. | |
| 5,539,398 A | 7/1996 | Hall et al. | |
| 5,546,107 A | 8/1996 | Deretsky et al. | |
| 5,555,286 A | 9/1996 | Tendler | |
| 5,557,606 A | 9/1996 | Moon et al. | 370/31 |
| 5,559,511 A | 9/1996 | Ito et al. | |
| 5,570,095 A | 10/1996 | Drouilhet et al. | |
| 5,581,259 A | 12/1996 | Schipper | 342/451 |
| 5,592,382 A | 1/1997 | Colley | 342/357.08 |
| 5,615,258 A | 3/1997 | Ho | 379/446 |
| 5,632,217 A | 5/1997 | Ford et al. | 114/150 |
| 5,638,279 A | 6/1997 | Kishi et al. | |
| 5,650,770 A | 7/1997 | Schlager et al. | |
| 5,652,706 A | 7/1997 | Morimoto et al. | |
| 5,654,718 A | 8/1997 | Beason et al. | 342/357 |
| 5,657,231 A | 8/1997 | Nobe et al. | |
| 5,685,732 A | 11/1997 | Lane | 439/369 |
| 5,689,269 A | 11/1997 | Norris | |
| 5,689,809 A | 11/1997 | Grube et al. | |
| 5,712,788 A | 1/1998 | Liaw et al. | |
| 5,712,899 A | 1/1998 | Pace, II | |
| 5,729,109 A | 3/1998 | Kaneko et al. | |
| 5,729,458 A | 3/1998 | Poppen | |
| 5,739,772 A | 4/1998 | Nanba et al. | |
| 5,742,666 A | 4/1998 | Alpert | 379/58 |
| 5,742,925 A | 4/1998 | Baba | |
| 5,757,289 A | 5/1998 | Nimura et al. | |
| 5,774,073 A | 6/1998 | Maekawa et al. | |
| 5,781,150 A | 7/1998 | Norris | |
| 5,786,789 A | 7/1998 | Janky | |
| 5,787,383 A | 7/1998 | Moroto et al. | |
| 5,793,631 A | 8/1998 | Ito | |
| 5,797,091 A | 8/1998 | Clise et al. | 455/404 |
| 5,804,810 A | 9/1998 | Woolley et al. | 235/492 |
| 5,809,447 A | 9/1998 | Kato | |
| 5,814,765 A | 9/1998 | Bauer et al. | 174/50.54 |
| 5,821,887 A | 10/1998 | Zhu | |
| 5,826,195 A | 10/1998 | Westerlage et al. | |
| 5,845,282 A | 12/1998 | Alley et al. | |
| 5,848,373 A | 12/1998 | DeLorme et al. | |
| 5,852,791 A | 12/1998 | Sato et al. | |
| 5,857,196 A | 1/1999 | Angle et al. | |
| 5,862,511 A | 1/1999 | Croyle et al. | |
| 5,874,905 A | 2/1999 | Nanba et al. | |
| 5,877,724 A | 3/1999 | Davis | 342/357 |
| 5,877,751 A | 3/1999 | Kanemitsu et al. | |
| 5,878,368 A | 3/1999 | DeGraaf | |
| 5,890,070 A | 3/1999 | Hamada | 455/524 |
| 5,890,092 A | 3/1999 | Kato et al. | |
| 5,892,441 A | 4/1999 | Woolley et al. | 340/539 |
| 5,893,081 A | 4/1999 | Poppen | |

| Patent No. | Date | Name | Ref |
|---|---|---|---|
| 5,899,907 A | 5/1999 | Johnson | 606/73 |
| 5,902,347 A | 5/1999 | Backman et al. | 701/200 |
| 5,902,349 A | 5/1999 | Endo et al. | |
| 5,910,172 A | 6/1999 | Peneberg | |
| 5,911,773 A | 6/1999 | Mutsuga et al. | |
| 5,914,675 A | 6/1999 | Tognazzini | |
| 5,917,405 A | 6/1999 | Joao | 340/426 |
| 5,925,090 A | 7/1999 | Poonsaengsathit | |
| 5,926,118 A | 7/1999 | Hayashida et al. | |
| 5,929,752 A | 7/1999 | Janky et al. | |
| 5,938,721 A | 8/1999 | Dussell et al. | |
| 5,946,687 A | 8/1999 | Gehani et al. | |
| 5,946,692 A | 8/1999 | Faloutsos et al. | |
| 5,951,622 A | 9/1999 | Nomura | |
| 5,952,959 A | 9/1999 | Norris | |
| 5,953,722 A | 9/1999 | Lampert et al. | |
| 5,959,529 A | 9/1999 | Kail | 340/539 |
| 5,963,130 A | 10/1999 | Schlager et al. | |
| 5,977,885 A | 11/1999 | Watanabe | |
| 5,978,730 A | 11/1999 | Poppen et al. | |
| 5,982,885 A | 11/1999 | Ho | 379/446 |
| 5,992,809 A | 11/1999 | Sweere et al. | 248/278.1 |
| 5,995,000 A | 11/1999 | King | 340/438 |
| 5,995,970 A | 11/1999 | Robinson et al. | |
| 6,002,982 A | 12/1999 | Fry | |
| 6,005,513 A | 12/1999 | Hardesty | 342/357.09 |
| 6,009,375 A | 12/1999 | Sakumoto et al. | 342/357.14 |
| 6,011,510 A | 1/2000 | Yee et al. | |
| 6,013,080 A | 1/2000 | Khalili | 606/86 |
| 6,021,406 A | 2/2000 | Kuznetsov | |
| 6,023,655 A | 2/2000 | Nomura | |
| 6,028,537 A | 2/2000 | Suman et al. | 340/988 |
| 6,035,299 A | 3/2000 | White et al. | |
| 6,038,509 A | 3/2000 | Poppen et al. | |
| 6,038,559 A | 3/2000 | Ashby et al. | |
| 6,040,824 A | 3/2000 | Maekawa et al. | |
| 6,046,688 A | 4/2000 | Higashikata et al. | 340/995 |
| 6,047,280 A | 4/2000 | Ashby et al. | |
| 6,052,597 A | 4/2000 | Ekstrom | 455/456 |
| 6,052,645 A | 4/2000 | Harada | |
| 6,061,003 A | 5/2000 | Harada | |
| 6,061,630 A | 5/2000 | Walgers et al. | |
| 6,064,336 A | 5/2000 | Krasner | 342/357.05 |
| 6,064,922 A | 5/2000 | Lee | 701/3 |
| 6,069,588 A | 5/2000 | O'Neill, Jr. | 343/713 |
| D426,225 S | 6/2000 | Davis | D10/46 |
| D426,226 S | 6/2000 | Ridinger | D14/188 |
| D427,177 S | 6/2000 | Yamazaki | D14/192 |
| 6,073,076 A | 6/2000 | Crowley et al. | |
| 6,081,803 A | 6/2000 | Ashby et al. | |
| 6,085,090 A | 7/2000 | Yee et al. | |
| 6,088,652 A | 7/2000 | Abe | |
| 6,101,443 A | 8/2000 | Kato et al. | |
| 6,108,603 A | 8/2000 | Karunanidhi | |
| 6,111,539 A | 8/2000 | Mannings et al. | |
| 6,112,153 A | 8/2000 | Schaaf et al. | |
| 6,112,200 A | 8/2000 | Livshutz et al. | |
| 6,119,066 A | 9/2000 | Sugiura et al. | |
| 6,121,314 A | 9/2000 | Richter et al. | |
| 6,121,900 A | 9/2000 | Takishita | |
| 6,122,593 A | 9/2000 | Friederich et al. | |
| 6,124,826 A | 9/2000 | Garthwaite et al. | 342/357.09 |
| 6,126,659 A | 10/2000 | Wack | 606/60 |
| 6,128,515 A | 10/2000 | Kabler et al. | |
| 6,128,573 A | 10/2000 | Nomura | |
| 6,129,321 A | 10/2000 | Minelli et al. | |
| 6,134,501 A | 10/2000 | Oumi | |
| 6,144,336 A | 11/2000 | Preston et al. | |
| 6,148,261 A | 11/2000 | Obradovich et al. | 701/208 |
| 6,148,262 A | 11/2000 | Fry | |
| 6,151,552 A | 11/2000 | Koizumi et al. | |
| 6,161,092 A | 12/2000 | Latshaw | |
| 6,166,626 A | 12/2000 | Janky et al. | |
| 6,166,698 A | 12/2000 | Turnbull et al. | 343/713 |
| 6,169,956 B1 | 1/2001 | Morimoto et al. | |
| 6,172,641 B1 | 1/2001 | Millington | |
| 6,173,933 B1 | 1/2001 | Whiteside et al. | |
| 6,182,006 B1 | 1/2001 | Meek | |
| 6,182,010 B1 | 1/2001 | Berstis | |
| 6,184,823 B1 | 2/2001 | Smith et al. | |
| 6,192,314 B1 | 2/2001 | Khavakh et al. | |
| 6,193,759 B1 | 2/2001 | Ro et al. | 623/23.28 |
| 6,199,013 B1 | 3/2001 | O'Shea | |
| 6,199,045 B1 | 3/2001 | Giniger et al. | |
| 6,202,024 B1 | 3/2001 | Yokoyama et al. | |
| 6,202,026 B1 | 3/2001 | Nimura et al. | |
| 6,219,457 B1 | 4/2001 | Potu | |
| 6,236,338 B1 | 5/2001 | Hamada | 340/995 |
| 6,236,358 B1 | 5/2001 | Durst et al. | 342/357.09 |
| 6,240,276 B1 | 5/2001 | Camp, Jr. | 455/71 |
| 6,246,376 B1 | 6/2001 | Bork et al. | 343/760 |
| 6,249,740 B1 | 6/2001 | Ito et al. | |
| 6,249,744 B1 | 6/2001 | Morita | |
| 6,255,800 B1 | 7/2001 | Bork | 320/115 |
| 6,256,351 B1 | 7/2001 | Hong | |
| 6,259,988 B1 | 7/2001 | Galkowski et al. | |
| 6,263,276 B1 | 7/2001 | Yokoyama et al. | |
| 6,263,277 B1 | 7/2001 | Tanimoto et al. | |
| 6,266,612 B1 | 7/2001 | Dussell et al. | |
| 6,266,615 B1 | 7/2001 | Jin | |
| 6,270,502 B1 | 8/2001 | Stulberg | |
| 6,275,707 B1 | 8/2001 | Reed et al. | 455/456 |
| 6,278,402 B1 | 8/2001 | Pippin | |
| 6,278,994 B1 | 8/2001 | Fuh et al. | |
| 6,285,950 B1 | 9/2001 | Tanimoto | |
| 6,285,951 B1 | 9/2001 | Gaskins et al. | |
| 6,292,743 B1 | 9/2001 | Pu et al. | |
| 6,295,449 B1 | 9/2001 | Westerlage et al. | |
| 6,297,781 B1 | 10/2001 | Turnbull et al. | 343/713 |
| 6,298,303 B1 | 10/2001 | Khavakh et al. | |
| 6,298,305 B1 | 10/2001 | Kadaba et al. | |
| 6,307,573 B1 | 10/2001 | Barros | |
| 6,308,177 B1 | 10/2001 | Israni et al. | |
| 6,309,395 B1 | 10/2001 | Smith | |
| 6,314,365 B1 | 11/2001 | Smith | |
| 6,317,684 B1 | 11/2001 | Roeseler et al. | |
| 6,317,687 B1 | 11/2001 | Morimoto et al. | |
| 6,321,158 B1 | 11/2001 | DeLorme et al. | |
| 6,324,467 B1 | 11/2001 | Machii et al. | |
| 6,339,706 B1 | 1/2002 | Tillgren et al. | 455/419 |
| D453,752 S | 2/2002 | Lee | D14/192 |
| 6,345,179 B1 | 2/2002 | Wiegers et al. | 455/344 |
| 6,347,278 B2 | 2/2002 | Ito | 701/200 |
| 6,349,257 B1 | 2/2002 | Liu et al. | |
| 6,366,672 B1 | 4/2002 | Tsay | 379/446 |
| 6,366,771 B1 | 4/2002 | Angle et al. | 455/414.1 |
| 6,370,741 B1 | 4/2002 | Lu | 24/523 |
| 6,373,430 B1 | 4/2002 | Beason et al. | |
| 6,374,079 B1 | 4/2002 | Hsu | 455/11.1 |
| 6,374,177 B1 | 4/2002 | Lee et al. | |
| 6,374,179 B1 | 4/2002 | Smith et al. | 701/207 |
| 6,381,535 B1 | 4/2002 | Durocher et al. | |
| D457,873 S | 5/2002 | Ng | D14/197 |
| 6,388,877 B1 | 5/2002 | Canova, Jr. et al. | |
| 6,389,291 B1 | 5/2002 | Pande et al. | 455/456 |
| 6,393,149 B2 | 5/2002 | Friederich et al. | |
| 6,401,034 B1 | 6/2002 | Kaplan et al. | 701/209 |
| 6,401,035 B2 | 6/2002 | Jin | |
| 6,405,123 B1 | 6/2002 | Rennard et al. | |
| 6,411,899 B2 | 6/2002 | Dussell et al. | 701/211 |
| 6,414,629 B1 | 7/2002 | Curcio | 342/357.08 |
| 6,421,608 B1 | 7/2002 | Motoyama et al. | 701/213 |
| 6,427,119 B1 | 7/2002 | Stefan et al. | |
| 6,427,122 B1 | 7/2002 | Lin | 701/214 |
| 6,427,959 B1 | 8/2002 | Kalis et al. | 248/288.11 |
| 6,430,498 B1 | 8/2002 | Maruyama et al. | 342/357.08 |
| 6,434,478 B1 | 8/2002 | Ikeda | 701/200 |
| 6,434,485 B1 | 8/2002 | Beason et al. | 701/213 |
| 6,453,236 B1 | 9/2002 | Aoki | 701/211 |
| 6,456,234 B1 | 9/2002 | Johnson | |
| 6,456,938 B1 | 9/2002 | Barnard | |
| 6,460,046 B1 | 10/2002 | Meek | |
| 6,464,185 B1 | 10/2002 | Whiteside et al. | |
| 6,470,267 B1 | 10/2002 | Nozaki | 701/209 |
| 6,477,526 B2 | 11/2002 | Hayashi et al. | |
| 6,484,093 B1 | 11/2002 | Ito et al. | |
| 6,492,941 B1 | 12/2002 | Beason et al. | |
| 6,496,709 B2 | 12/2002 | Murray | 455/569.1 |

| | | | |
|---|---|---|---|
| 6,496,777 B2 | 12/2002 | Tennison et al. ............... 701/213 |
| 6,504,496 B1 | 1/2003 | Mesarovic et al. |
| 6,504,503 B1 | 1/2003 | Saint-Hilaire et al. ... 342/357.08 |
| 6,505,123 B1 | 1/2003 | Root et al. |
| 6,509,869 B2 | 1/2003 | Aoyama ................ 342/357.13 |
| 6,510,379 B1 | 1/2003 | Hasegawa et al. |
| 6,512,525 B1 | 1/2003 | Capps et al. |
| 6,518,919 B1 | 2/2003 | Durst et al. ............. 342/357.07 |
| 6,522,875 B1 | 2/2003 | Dowling et al. |
| 6,526,351 B2 | 2/2003 | Whitham |
| 6,529,824 B1 | 3/2003 | Obradovich et al. |
| 6,532,152 B1 | 3/2003 | White et al. |
| 6,535,743 B1 | 3/2003 | Kennedy et al. |
| 6,542,814 B2 | 4/2003 | Polidi et al. |
| 6,545,637 B1 | 4/2003 | Krull et al. ................. 701/209 |
| 6,556,899 B1 | 4/2003 | Harvey et al. ........... 342/357.09 |
| 6,563,440 B1 | 5/2003 | Kangas |
| 6,563,459 B2 | 5/2003 | Takenaga ................. 342/357.1 |
| 6,567,743 B1 | 5/2003 | Mueller et al. |
| 6,574,553 B1 | 6/2003 | Beesley et al. |
| 6,574,554 B1 | 6/2003 | Beesley et al. |
| 6,581,003 B1 | 6/2003 | Childs et al. |
| 6,581,025 B2 | 6/2003 | Lehman ..................... 702/178 |
| 6,589,285 B2 | 7/2003 | Peneberg |
| 6,594,666 B1 | 7/2003 | Biswas et al. |
| 6,615,130 B2 | 9/2003 | Myr |
| 6,615,131 B1 | 9/2003 | Rennard et al. |
| 6,633,809 B1 | 10/2003 | Aizono et al. |
| 6,636,749 B2 | 10/2003 | Holmes et al. ............. 455/569.2 |
| 6,646,603 B2 | 11/2003 | Dooley et al. ................ 342/458 |
| 6,646,864 B2 | 11/2003 | Richardson .................. 61/681 |
| 6,650,996 B1 | 11/2003 | Beesley et al. |
| 6,656,188 B2 | 12/2003 | Naybour et al. |
| 6,657,569 B2 | 12/2003 | Barnett ........................ 341/65 |
| 6,674,849 B1 | 1/2004 | Froeberg |
| 6,675,093 B1 | 1/2004 | Childs et al. |
| 6,680,694 B1 | 1/2004 | Knockeart et al. ....... 342/357.09 |
| 6,687,615 B1 | 2/2004 | Krull et al. |
| 6,693,586 B1 | 2/2004 | Walters et al. ........... 342/357.13 |
| 6,694,256 B1 | 2/2004 | Childs et al. |
| 6,701,252 B2 | 3/2004 | Brown ........................ 701/213 |
| 6,704,645 B1 | 3/2004 | Beesley et al. |
| 6,707,421 B1 | 3/2004 | Drury et al. ................. 342/375.1 |
| 6,708,112 B1 | 3/2004 | Beesley et al. |
| 6,711,005 B2 | 3/2004 | Martin ......................... 361/683 |
| 6,725,155 B1 | 4/2004 | Takahashi et al. |
| 6,728,632 B2 | 4/2004 | Medl ........................... 701/207 |
| 6,742,052 B2 | 5/2004 | Himmel et al. ................. 710/2 |
| 6,754,583 B2 | 6/2004 | Verbil ......................... 701/213 |
| 6,765,528 B2 | 7/2004 | Tranchina et al. .......... 342/357.1 |
| 6,768,450 B1 | 7/2004 | Walters et al. ........... 342/357.09 |
| 6,768,942 B1 | 7/2004 | Chojnacki |
| 6,771,163 B2 | 8/2004 | Linnett ...................... 340/309.5 |
| 6,774,795 B2 | 8/2004 | Eshelman ................. 340/573.1 |
| 6,775,612 B1 | 8/2004 | Kao et al. |
| 6,782,318 B2 | 8/2004 | Beesley et al. |
| 6,789,012 B1 | 9/2004 | Childs et al. |
| 6,791,477 B2 | 9/2004 | Sari et al. ................... 340/825.36 |
| 6,798,358 B2 | 9/2004 | Joyce ....................... 340/995.24 |
| 6,799,115 B1 | 9/2004 | Childs et al. |
| 6,807,483 B1 | 10/2004 | Chao et al. |
| 6,807,484 B2 | 10/2004 | Inoue et al. .................... 701/213 |
| 6,812,888 B2 | 11/2004 | Drury ....................... 342/357.13 |
| 6,816,782 B1 | 11/2004 | Walters et al. ................ 701/209 |
| 6,823,256 B1 | 11/2004 | Burt |
| 6,834,230 B1 | 12/2004 | Childs et al. |
| 6,839,624 B1 | 1/2005 | Beesley et al. |
| 6,845,322 B1 | 1/2005 | Chao et al. |
| 6,847,889 B2 | 1/2005 | Park .............................. 701/209 |
| 6,847,890 B1 | 1/2005 | Childs et al. |
| 6,850,188 B1 | 2/2005 | Lee ........................... 342/357.08 |
| 6,850,842 B2 | 2/2005 | Park |
| 6,856,893 B2 | 2/2005 | Beesley et al. |
| 6,856,899 B2 | 2/2005 | Krull et al. ................... 701/209 |
| 6,856,900 B1 | 2/2005 | Childs et al. |
| 6,871,144 B1 | 3/2005 | Lee |
| 6,873,850 B2 | 3/2005 | Dowling ...................... 455/456 |
| 6,889,138 B1 | 5/2005 | Krull et al. |
| 6,892,135 B1 | 5/2005 | Krull et al. |
| 6,898,520 B2 | 5/2005 | Kao et al. |
| 6,898,526 B2 | 5/2005 | Doyle et al. .................. 701/300 |
| 6,920,328 B2 | 7/2005 | Wollrab ....................... 455/456 |
| 6,928,468 B2 | 8/2005 | Leemakers ................... 709/221 |
| 6,941,156 B2 | 9/2005 | Mooney ....................... 455/553 |
| 6,944,651 B2 | 9/2005 | Onyon .......................... 709/204 |
| 6,948,043 B2 | 9/2005 | Mathis |
| 6,970,130 B1 * | 11/2005 | Walters et al. ........... 342/357.06 |
| 6,972,715 B2 | 12/2005 | Hollis ...................... 342/357.07 |
| 6,975,940 B1 | 12/2005 | Childs et al. |
| 6,980,906 B2 | 12/2005 | Kao et al. |
| 6,985,753 B2 | 1/2006 | Rodriguez ................... 455/575.1 |
| 6,999,873 B1 | 2/2006 | Krull et al. |
| 7,006,851 B2 | 2/2006 | Holmes et al. ............. 455/569.2 |
| 7,006,903 B2 | 2/2006 | Smith ............................ 701/3 |
| 2001/0045949 A1 | 11/2001 | Chithambaram et al. |
| 2002/0004704 A1 | 1/2002 | Nagatsuma et al. .......... 701/213 |
| 2002/0006806 A1 | 1/2002 | Kinnunen et al. ............ 455/550 |
| 2002/0028702 A1 | 3/2002 | Kim |
| 2002/0070881 A1 | 6/2002 | Marcarelli et al. |
| 2002/0091527 A1 | 7/2002 | Shiau |
| 2002/0102988 A1 | 8/2002 | Myllymaki |
| 2002/0102989 A1 | 8/2002 | Calvert et al. ................. 455/456 |
| 2002/0120753 A1 | 8/2002 | Levanon et al. |
| 2002/0128774 A1 | 9/2002 | Takezaki et al. .............. 701/211 |
| 2002/0164998 A1 | 11/2002 | Younis |
| 2002/0173905 A1 | 11/2002 | Jin |
| 2002/0193945 A1 | 12/2002 | Tan et al. |
| 2003/0013483 A1 | 1/2003 | Ausems et al. |
| 2003/0069899 A1 | 4/2003 | Brown et al. |
| 2003/0092433 A1 | 5/2003 | Flannery ....................... 455/416 |
| 2003/0107516 A1 | 6/2003 | Hansmann et al. ...... 342/357.08 |
| 2003/0131023 A1 | 7/2003 | Bassett et al. |
| 2003/0131059 A1 | 7/2003 | Brown et al. |
| 2004/0003051 A1 | 1/2004 | Krzyzanowski ............... 709/217 |
| 2004/0015239 A1 | 1/2004 | LeBeguec |
| 2004/0024471 A1 | 2/2004 | Ferree |
| 2004/0153239 A1 | 8/2004 | Krull et al. ..................... 701/209 |
| 2004/0155815 A1 | 8/2004 | Muncaster et al. ...... 342/357.09 |
| 2004/0220726 A1 | 11/2004 | Jin |
| 2005/0162513 A1 * | 7/2005 | Chan ............................ 348/118 |
| 2005/0215194 A1 * | 9/2005 | Boling et al. ................ 455/3.02 |
| 2005/0287958 A1 | 12/2005 | Jui Sheng et al. ............. 455/88 |
| 2006/0002123 A1 * | 1/2006 | Hutzel et al. ................... 362/494 |

FOREIGN PATENT DOCUMENTS

| | | |
|---|---|---|
| CN | 1391687 T | 10/2003 |
| DE | 004320976 | 1/1995 |
| EP | 0061674 | 6/1982 |
| EP | 0123562 | 4/1984 |
| EP | 0242099 | 10/1987 |
| EP | 0588370 | 3/1994 |
| EP | 0752450 | 1/1997 |
| FR | 2541801 | 2/1983 |
| FR | 2818414 | 6/2002 |
| GB | 2412254 | 9/2005 |
| JP | 08-221694 | 8/1996 |
| JP | 10-132594 | 5/1998 |
| JP | 10319396 | 12/1998 |
| WO | 01/23839 | 4/2001 |
| WO | 01/61276 | 8/2001 |
| WO | 02/060157 | 8/2002 |
| WO | 02/103291 | 12/2002 |
| WO | 03/058170 | 7/2003 |
| WO | 2005/090919 | 9/2005 |

OTHER PUBLICATIONS

U.S. Appl. No. 10/086,370, filed Feb. 18, 2002, Childs et al.
U.S. Appl. No. 10/269,573, filed Oct. 11, 2002, Childs et al.
U.S. Appl. No. 10/962,700, filed Oct. 12, 2004, Childs et al.
U.S. Appl. No. 10/976,998, filed Oct. 29, 2004, Childs et al.
U.S. Appl. No. 10/993,174, filed Nov. 19, 2004, Krull et al.
U.S. Appl. No. 10/993,189, filed Nov. 19, 2004, Childs et al.
U.S. Appl. No. 11/035,242, filed Jan. 13, 2005, Beesley et al.
U.S. Appl. No. 11/035,243, filed Nov. 5, 2003, Krull et al.
http://www.tomtom.com/products/accessory.php?ID=173&Product=208&Category=&Context=1&Language=1.

http://www.tomtom.com/products/features.php?ID=208&Language=1.
http://www.smart2go.com/us/mobile_navigation/the_box.
http://www.alk.com/copilot/smartphone.asp.
http://www.arkon.com/gpsmount.html.
https://www.navigon.com/site/int/en/shop/consumer/smartPhone/691.
http://www.navigon.com/site/int/en/mobile_navigation/mobile_navigator.
http://www.usglobalsat.com/item.asp?itemid=9.
http://h10010.www1.hp.com/wwpc/uk/en/ho/WF13a/21675-21679-21679-21679-297609-12224978.html.
http://www.ps-gps.com/scripts/prodView.asp?idproduct=11.
http://www.ps-gps.com/Scripts/HGP-100%20application.jpg.
http://www.gonav.com.cn/.
"An optimal pathfinder for vehicles in real-world digital terrain maps", http://www.nease.net/jamsoft/shortestpath/pathfinder/4.html, 11 pages, (1999).
"Informed Search Methods", Artificial Intelligence, A Modern Approach, Prentice Hall, Inc., pp. 92-115, (1995).
"Real-Time Vehicle Routing in Dynamic and Stochastic Urban Traffic Networks", http://www.gpu.srv.ualberta.ca/lfu/research.htm, pp. 1-3, (1997).
Ahuja, R., et al., "Faster Algorithms for the Shortest Path Problem", Journal of the Association for Computing Machinery, 37(2), pp. 213-223, (1990).
Booten, A., "The Automatic Position Reporting System", http:/www.oarc.net/aprs.htm, 5pages, (2002).
BHourrie, S. "Tendler Updates FoneFinder", Wireless Week, p. 24, Jun. 28, 1999.
Bravman, J.S. et al., "Automatic Vehicle Monitoring", 10 pages.
Chung et al.; Level-Compressed Huffman Decoding; IEEE-Transactions on Communication; Oct. 1999; vol. 47, No. 10; pp. 1455-1457.
Cung, V., et al. "An Efficient Implementation of Parallel A", CFPAR, Montreal, Canada, pp. 153-167, (1994).
Fredman, M., et al., "Fibonacci heaps and their uses in improved network optimization algorithms", Journal of the ACM, 34(3), 2 pages, (1987).
Fu, L., "Heuristic Shortest Path Algorithms and their Potential IVHS Applications", Proceedings of the Fourth University of Alberta—University of Calgary, Joint Graduate Student Symposium in Transportation Engineering, pp. 83-109, (1995).
Ikeda, T., et al., "A Fast Algorithm for Finding Better Routes by AI Search Techniques", Vehicle Navigation and Information Systems Conference Proceedings, pp. 291-296, (1994).

Kaindi, H., et al., "Memory-Bounded Bidirectional Search", Proceedings of the 12th National Conference on Art, AAAI press, Seattle, WA, pp. 1359-1364, (1994).
Laporte, G., "The Vehicle Routing Problem: An overview of exact and approximate algorithms", European Journal of Operational Research, 59, pp. 345-358, (1992).
Microsoft Press Computer Dictionary, Third Edition, Microsoft Press, p. 281 (1997).
Myers, B., "Data Structures for Best-First Search", http://www4.ncsu.edu/jbmyers/dsai.htm, pp. 1-6, (1997).
Nekritch, Y.; Byte-oriented decoding of canonical Huffman codes; IEEE-Information Theory 2000; Jun. 2000; p. 371.
Nilsen, P., "Application of the Global-Positioning System (GPS) to Automatic Vehicle Monitoring", 1981 Carnahan Conference on Crime Countermeasures, University of Kentucky, pp. 7-11, (1981).
Oberhauser et al.; Fast data structures for shortest path routing: a comparative evaluation; 1995 IEEE International Conference on Gateway to Globalization; Jun. 1995; vol. 3, pp. 1597-1601.
Ronngren, R., et al., "Parallel and Sequential Priority Queue Algorithms", ACM Transactions on Modeling and Computer Simulation, 7 (2), pp. 168-172, 198, 199, (1997).
Rosenberg, J. M. Dictionary of Computers, Information Processing and Telecommunications, Second Edition, Aug. 1990.
Stout, B., "Smart Moves: Intelligent Pathfinding", Gamasutra, http://www.gamasutra.com/features/programming/080197/pathfinding.htm, pp. 1-11, (1997).
Wai, L., et al., "Comparative Study of Shortest Path Algorithm for Transport Network", USRP Report 2, http://www.comp.nus.edu.sg/,leonghoe/USRPreport-txt.html, pp. 1-10, (1999).
Zhan, F.N., "Three Fastest Shortest Path Algorithms on Real Road Networks: Data Structures and Procedures", Journal of Geographic Information and Decision Analysis, 1 (1), http://www.geog.uwo.ca/gimda/journal/vol1.1/Zhan/Zhan.htm, 11 pages, (1997).
Zhao, Y., et al., "An Adaptive Route-Guidance Algorithm for Intelligent Vehicle Highway Systems", American Control Conference, Boston, MA, Department of Electrical Engineering and Computer Science, The University of Michigan, pp. 2568-2573, (1991).
NavTalk Cellular Phone/GPS Receiver: Owners Manual and Reference Guide, Garmin Corporation, Jan. 2000.
"AX.25 Amateur Packet-Radio Link-Layer Protocol", Version 2.2, Nov. 1997 from http://www.tapr.org/pub_ax25.html.
Garmin Rino series, Sneak Peak—et the Safety of GPS with the Convenience of a 2-way Radio, copyright 2001, 2 pages.

* cited by examiner

ELECTRONIC DEVICE MOUNT

BACKGROUND OF THE INVENTION

1. Field of the Invention

The present invention relates to electronic device mounts. More particularly, the invention relates to an electronic device mount that is operable to provide navigation information to an electronic device.

2. Description of the Related Art

Navigation devices are becoming increasingly popular due to the many versatile functions they provide. Navigation devices typically include location determining components, such as Global Positioning System (GPS) receivers, and processing elements operable to provide navigation information such as desired routes of travel from current geographic locations to desired geographic locations. Although navigation devices have traditionally been stand-alone devices, many manufacturers are now integrating navigation functions into other electronic devices such as cell phones, personal digital assistants (PDAs), exercise devices, etc. Unfortunately, due to the size of location determining components and processing elements, it is often difficult or impossible to compactly integrate navigation devices into other electronic devices.

To eliminate the need to include location determining components and processing elements within otherwise compact housings, electronic devices have been developed that are operable to couple with conventional navigation devices to receive navigation information. Although such devices are operable to receive navigation information without incorporating integral location determining components, they require complicated and cumbersome coupling with discrete navigation devices.

SUMMARY OF THE INVENTION

The present invention solves the above-described problems and provides a distinct advance in the art of electronic device mounts. More particularly, the invention provides an electronic device mount that is operable to wirelessly provide navigation information to an electronic device. Such a configuration enables the electronic device to receive navigation information from the mount while being compactly and securely retained.

In one embodiment, the present invention provides a mount including a housing operable to securely retain an electronic device and removably couple with a surface. The housing preferably encloses or supports various portions of an antenna, a processor, and/or a transmitter. The antenna is operable to receive a navigation signal, the processor is operable to generate navigation information utilizing the received navigation signal, and the transmitter operable to wirelessly transmit the generated navigation information to the electronic device.

In another embodiment, the mount comprises a housing including a front portion, a rear portion generally opposed to the front portion, and a plurality of spring-biased posts positioned around a least a portion of the periphery of the front portion and operable to securely retain an electronic device. The rear portion includes a mounting element operable to removably couple with a surface.

In another embodiment, the mount includes a housing operable to securely retain an electronic device and removably couple with a surface. The housing preferably encloses or supports various portions of an antenna, a processor, and/or a transmitter. The antenna is operable to receive a navigation signal, the processor is operable to generate navigation information utilizing the received navigation signal, and the transmitter operable to wirelessly transmit the generated navigation information to the electronic device. The housing generally comprises a front portion, a rear portion generally opposed to the front portion, and a plurality of spring-biased posts positioned around a least a portion of the periphery of the front portion and operable to securely retain the electronic device. The rear portion includes a mounting element operable to removably couple with the surface.

Other aspects and advantages of the present invention will be apparent from the following detailed description of the preferred embodiments and the accompanying drawing figures.

BRIEF DESCRIPTION OF THE DRAWING FIGURES

A preferred embodiment of the present invention is described in detail below with reference to the attached drawing figures, wherein.

Figure 1:
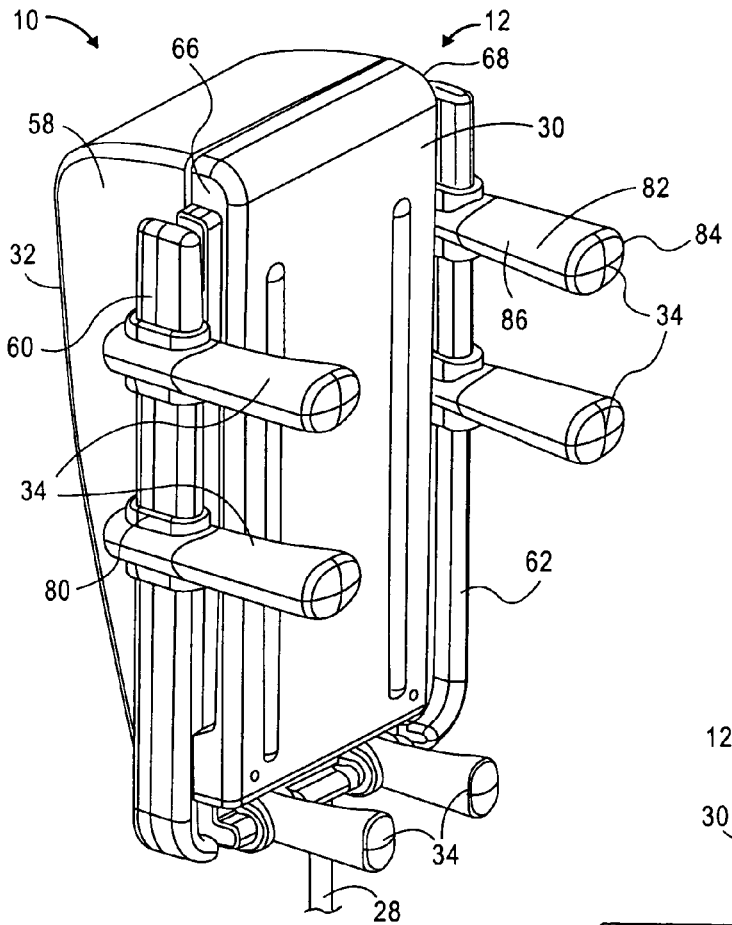
FIG. 1 is a perspective view of an electronic device mount configured in accordance with various preferred embodiments of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE PREFERRED EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Referring to FIGS. 1-15, the mount 10 generally includes a housing 12 operable to securely retain an electronic device D and removably couple with a surface. The housing 12 may retain the electronic device D and removably couple with the surface utilizing various conventional connectors and coupling elements. For example, the housing 12 may securely retain the electronic device D and/or couple with the surface utilizing straps, latches, adhesive elements, hook and loop fasteners such as Velco®, fitted recesses or slots, suction elements, combinations thereof, etc. By securely retaining the electronic device D, the housing 12 prevents the electronic device D from being dislodged or damaged during potentially turbulent driving environments. However, preferred mounting and coupling elements are described below in more detail.

The electronic device D may be any device operable to utilize navigation information. Preferably, the electronic device D is a cellular phone, personal digital assistant (PDA), or a portable entertainment device operable to utilize received navigation information for processing, calculation, configuration, or display. As discussed below, the electronic device D is preferably operable to receive wireless information from the mount 10. In various embodiments the electronic device D may be a Bluetooth equipped cellular phone operable to transmit and receive information to and from the mount 10.

In one embodiment of the present invention, the housing 12 is operable to enclose or support various portions of an antenna 14, a processor 18 coupled with the antenna 14, and a transmitter 16 coupled with the processor 18. The processor 18 is generally operable to process signals received by the antenna 14 and the transmitter 16 is generally operable to wirelessly transmit information processed by the processor 18.

The antenna 14 may be any element or combination of elements operable to receive and/or detect electromagnetic energy. Preferably, the antenna 14 is operable to receive a navigation signal such as a Global Positioning System (GPS) signal. Thus, the antenna 14 may be, for example, an antenna utilized by a GPS receiver much like those provided in Garmin® products and disclosed in U.S. Pat. No. 6,434,485, which is incorporated herein by specific reference.

Additionally or alternatively, the antenna 14 may be operable to receive navigation signals other than satellite-originated GPS signals. For example, the antenna 14 may receive cellular or land-based radio-frequency navigation signals. Further, the antenna 14 may be operable to receive digital signals, such as wireless network signals. Thus, the antenna 14 is not necessarily strictly limited to a GPS antenna.

As is discussed in more detail below and shown in FIG. 2, the antenna 14 is preferably compactly configured for retention entirely within the housing 12. Such a configuration is desirable as it provides a smooth contour for the housing 12 without any potentially dangerous projections or aesthetically unpleasing elements. Alternatively, the antenna 14 may be external or removable from the housing 12, such as by being configured to screw or snap into a port provided on the housing 12. Thus, in some embodiments the antenna 14 may include only a port or receptacle for receiving an external navigation antenna.

The processor 18 is coupled with the antenna 14 and operable to generate navigation information utilizing the navigation signals received by the antenna 14. The processor 18 is preferably discrete from the antenna 14 and directly or indirectly coupled thereto via wired or wireless connections. However, in various embodiments the processor 18 and the antenna 14 may be integral such as where the processor 18 and antenna 14 form a part of the same integrated circuit or are positioned within a common circuit housing.

The processor 18 processes the received navigation signals to generate any type of navigation information in a substantially conventional manner. For instance, the generated navigation information may include a current geographic location of the mount 10, a previous geographic location of the mount 10, a speed of the mount 10, a distance traveled by the mount 10, a route from the current geographic location to a destination, a map corresponding to a determined geographic location, combinations thereof, etc. Further examples of the navigation information that may be generated by the processor 18 utilizing the received signals are disclosed in U.S. Pat. No. 6,947,838, which is incorporated herein by reference.

Figure 15:
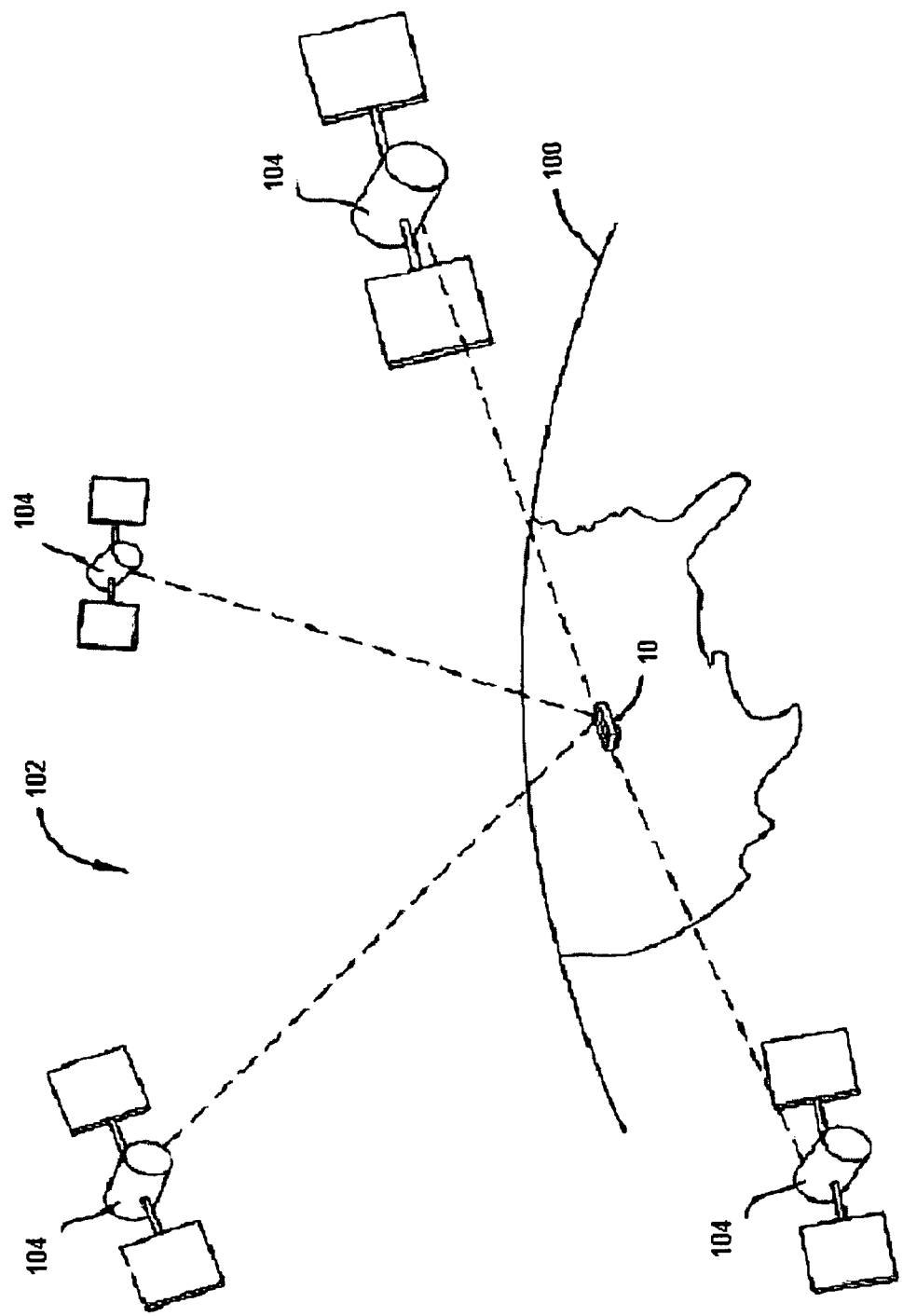
FIG. 15 is schematic diagram of a Global Positioning System (GPS) that may be utilized by various embodiments of the present invention.

As discussed above, the navigation signals acquired by the antenna 14 may correspond to spread spectrum GPS signals that may be utilized by the processor 18 to calculate the current geographic location of the mount 10. FIG. 15 shows one representative view of a GPS denoted generally by reference numeral 102. A plurality of satellites 104 are shown in orbit about the Earth 100. The orbit of each satellite is not necessarily synchronous with the orbits of other satellites and, in fact, is likely asynchronous. The mount 10, including the antenna 14 and processor 18, is shown receiving spread spectrum GPS satellite signals from the various satellites 104.

The spread spectrum signals continuously transmitted from each satellite 104 utilize a highly accurate frequency standard accomplished with an extremely accurate atomic clock. Each satellite 104, as part of its data signal transmission, transmits a data stream indicative of that particular satellite and timing information. To calculate location, the antenna 14 acquires spread spectrum GPS satellite signals from at least three satellites for the processor 18 to calculate its two-dimensional position by triangulation. Acquisition of an additional signal, resulting in signals from a total of four satellites, permits the processor 18 to calculate its three-dimensional position.

As should be appreciated, the processor 18 may utilize any method of generating navigation information and is not limited to the GPS-triangulation method discussed above. For example, the received navigation signal may include an encoded signal that the processor 18 decodes to reveal its location or other navigation information, the received navigation signal may correspond to digital information that is processed by the processor 18 to provide navigation information, and/or the received signal may directly provide navigation information with minimal involvement from the processor 18 such as a geographic map, a waypoint, a route or destination, etc.

Preferably, the mount 10 additionally includes a memory 20 coupled with the processor 18. The memory 20 may be integral or discrete with the processor 18 and may comprise dynamic and static memory components. The processor 18 may utilize the memory 20 to store data and information corresponding to the signals received by the antenna 14 including generated navigation information such as the current geographic location of the mount 10. Further, the processor 18 may utilize the data and information stored within the memory 20 to generate other navigation information, such as the distance traveled by the mount 10, the speed of the mount 10, the route traveled by the mount 10, the position of the mount 10 on a calculated route, etc.

The processor 18 may additionally process and generate information other than navigation information. For instance, the processor 18 may provide general processing capabilities and generate control information to control the functionality of the other mount components, such as the transmitter 16 and antenna 14.

The processor 18 may be any element or combination of elements operable to generate navigation information as discussed above. Thus, the processor 18 may include an application specific integrated circuit (ASIC), a programmable logic device (PLD) such as a field programmable gate array (FPGA), one or more discrete logic elements, a microprocessor, a microcontroller, combinations thereof, etc.

The transmitter 16 is operable to wirelessly communicate with the electronic device D. The transmitter 16 is coupled with the processor 18 and/or memory 20 to transmit navigation information generated by the processor 18, stored within the memory 20, and/or otherwise provided by or through the mount 10. The transmitter 16 is preferably also operable to wirelessly receive information from the electronic device D and provide the received information to the processor 18 and/or store the received information within the memory 20.

For instance, the transmitter 16 may be operable to transmit the current geographic location of the mount 10, a speed of the mount 10, or any other information generated by the processor 18, to the electronic device D. Preferably, the transmitter 16 continuously transmits navigation information and/or transmits navigation information at periodic intervals to enable the electronic device D to be regularly provided with current navigation information. However, in some embodiments the transmitter 16 may only transmit navigation information after wirelessly receiving a request from the electronic device D or when the mount 10 is otherwise functioned.

Further, the transmitter 16 is additionally operable to transmit non-navigation related information. For instance, as discussed below in more detail, the transmitter 16 is operable to transmit and receive audio information, such as signals corresponding to speech, to and from the electronic device D. Such a configuration enables the mount 10 to function as a "hands-free" device to provide speakerphone and other functional capabilities to the electronic device D without requiring a user to touch the electronic device D. Thus, the transmitter 16 may transmit and receive both navigation information and audio information to and from the electronic device D.

The transmitter 16 may comprise any device or combination of devices operable to wirelessly transmit information, including radio-frequency (RF) transmitters, optical transmitters, infrared transmitters, wireless fidelity (WiFi) devices, ultra wideband (UWB) devices, Global System for Mobile (GSM) communication devices, Code Division Multiple Access (CDMA) devices, Worldwide Interoperability for Microwave Access (Wi-Max) devices, other 802.11 compliant devices, combinations thereof, etc.

In some applications requiring two-way communication, the transmitter 16 may be replaced with a transceiver. For example, in the preferred embodiment, the transmitter 16 is capable of both transmitting and receiving, and may therefore actually be a transceiver. Of course, even in the preferred embodiment, it is still possible to add a separate and discrete receiver to supplement the transmitter 16.

Preferably, the transceiver 16 is a Bluetooth compatible transceiver operable to wirelessly send and receive data to and from other Bluetooth compatible devices. As is known in the art, Bluetooth compatible devices may be configured to wirelessly communicate with up to seven discrete devices to form a piconet. Utilizing the Bluetooth protocol, devices may easily and wirelessly share information. Thus, utilization of the Bluetooth protocol enables the transmitter 16 to readily communicate with the electronic device D, and other electronic devices, utilizing a standard protocol.

The transmitter 16 preferably includes an antenna, separate from the antenna 14, to enable transmission and reception of electromagnetic signals, such as Bluetooth signals. However, the antenna utilized by the transmitter 16 may be the same, or integral with, the antenna 14 to reduce component space.

In various embodiments the mount 10 may additionally include a microphone 22 and a speaker 24. The microphone 22 is operable to record and/or detect sounds and the speaker 24 is operable to generate sound in a substantially conventional manner. The microphone 22 and the speaker 24 are preferably each coupled with the processor 18 and/or the transmitter 16 to facilitate the hands-free functionality discussed above.

Audio information, such as sounds and speech recorded by the microphone 22, may be stored within the memory 20 and/or otherwise utilized by the processor 18. In various embodiments, the transmitter 16 is operable to transmit audio information corresponding to sounds recoded by the microphone 22 to the electronic device D. Similarly, the speaker 24 is operable to generate sounds utilizing audio information received by the transmitter 16, such as sounds corresponding to a call received by a cellular phone, and/or stored within the memory 20.

Thus, the user may utilize the mount 10 to provide generally conventional hands-free functionality. As is known in the art, cellular phones and other communication devices are often equipped with "hands-free" functionality to enable users to talk and listen with the devices without being required to hold or retain them. Instead of directly talking into the electronic device D, the user's speech may be recorded by the microphone 22 and transmitted to the electronic device D and instead of directly listening to the electronic device D, the speaker 24 may generate sounds corresponding to audio information received by the transmitter 16. As such, the mount 10 is operable to generally simultaneously provide both navigation information and hands-free functionality to the electronic device D.

Further, the microphone 22 may comprise a plurality of microphones to provide noise cancellation abilities to the mount 10. For example, the mount 10 may include one or more microphones positioned on each side of the housing 12 to enable each microphone to independently record sound. The audio information generated utilizing each microphone may then be compared by the processor 18, or another mount 10 element, to cancel background noise or any other audio not corresponding to the user's speech. The transmitter 16 may transmit the noise-canceled audio information to the electronic device D to provide an accurate representation of the user's speech.

Figure 8:
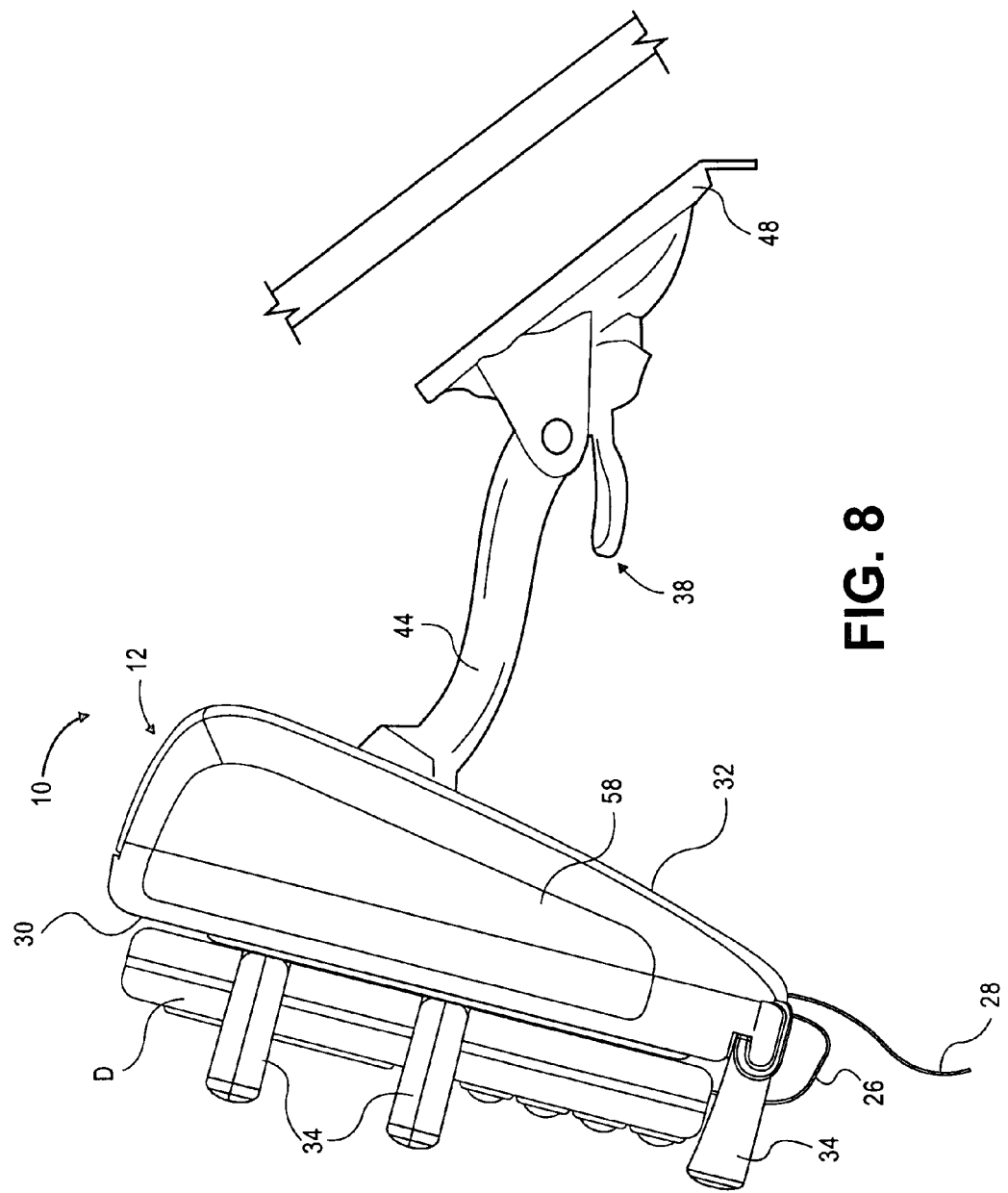
FIG. 8 is a side view showing the electronic device mount of FIG. 6 retaining the cellular phone and coupled with an automobile windshield utilizing the mounting apparatus of FIG. 7.

The mount 10 also preferably includes a coupling element 26 operable to electrically couple the mount 10 and the electronic device D and a power source 28 operable to provide power to the mount 10 and the electronic device D. As shown in FIG. 8, the coupling element 26 may comprise a conventional cable operable to provide electrical power from the mount 10 to the electronic device D. However, the coupling element 26 may comprise any element or combination of elements operable to propagate electrical energy between the mount 10 and the electronic device D. Utilization of the coupling element 26 enables the electronic device D to be powered and charged by the mount 10 when securely affixed thereto to conserve the primary power supply of the electronic device D.

The power source 28 may be any element or combinations of elements operable to provide electrical power to the mount 10. Preferably, the power source 28 also provides electrical power to the electronic device D through the coupling element 26 as discussed above. The power source 28 may be integral with the housing 12, such as in embodiments where the power source 28 comprises batteries.

Figure 9:
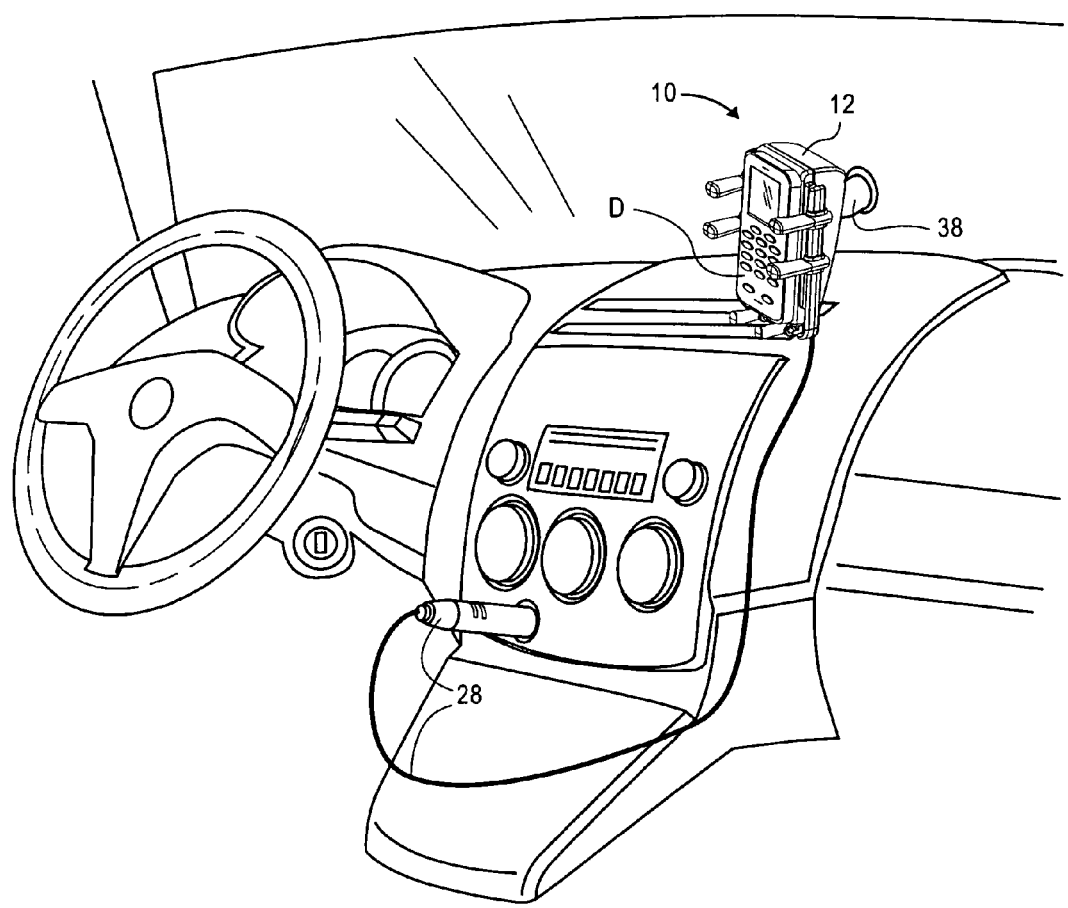
FIG. 9 is a perspective view showing the electronic device mount of FIG. 8 coupled with an automobile cigarette lighter.

Preferably, the power source 28 comprises a cable operable to relay electrical power from an external device to the mount 10. As shown in FIG. 9, the power source 28 more preferably comprises a cigarette lighter adapter operable to interface with an automobile cigarette lighter outlet and a cable extending from the adapter to provide electrical power from the automobile cigarette lighter outlet to the mount 10.

The power source 28 may additionally include transformers, voltage regulators, or other elements operable to condition power for utilization by the mount 10 and the electronic device D. Through utilization of the coupling element 26, the present invention is operable to provide electrical power to both the mount 10 and the electronic device D utilizing only one automobile cigarette lighter outlet. Such a configuration reduces the number of cables and adapters present in the automobile without restricting the use of navigation information or other mount functionality.

The housing 12 is operable to securely retain the electronic device D and house various portions of the mount 10. Preferably, the housing 12 houses at least portions of the antenna 14, the processor 18, the transmitter 16, the memory 20, the microphone 22, and the speaker 24. However, as should be appreciated, the housing 12 may house any combination of the mount elements, including only portions of the processor 18 and the transmitter 16.

In preferred embodiments, the housing 12 includes a front portion 30, a rear portion 32 generally opposed to the front portion 30, and a plurality of posts 34 positioned around at least a portion of the periphery of the front portion 30 to securely retain the electronic device D therebetween.

Figure 5:
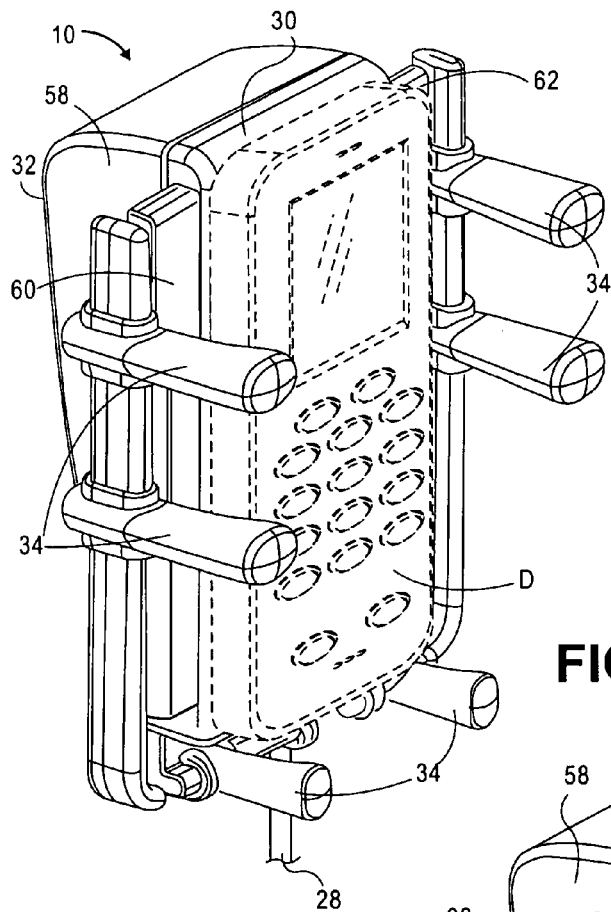
FIG. 5 is a perspective view of the electronic device mount of FIGS. 1-3, the mount shown receiving a cellular phone.
Figure 6:
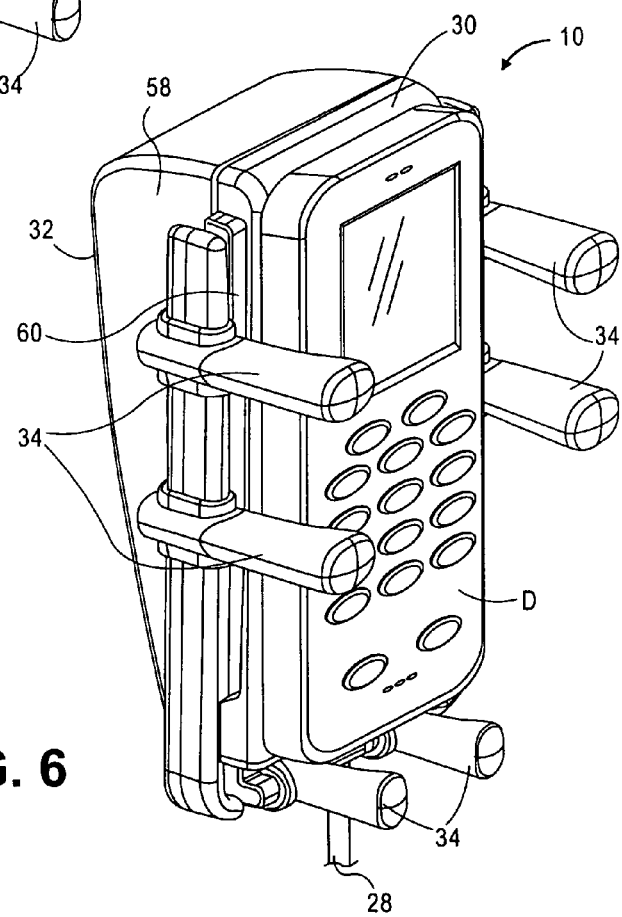
FIG. 6 is a perspective view of the electronic device mount of FIGS. 1-3 and 5, the mount shown securely retaining the cellular phone.

The front portion 30 is generally operable to abut at least a portion of the electronic device D when the electronic device D is retained between the posts 34, as shown in FIGS. 5-6. Thus, the front portion 30 preferably presents a generally flat profile to enable the electronic device D to easily abut, contact, and/or slide against the front portion 30 without damage to the housing 12 or the electronic device D.

The rear portion 32 includes a mounting element 36 operable to couple with the surface. The mounting element 36 may include any element operable to couple the housing 12 to the surface, including the various coupling elements discussed above, such as latches, adhesives, suction elements, etc.

Figure 2:
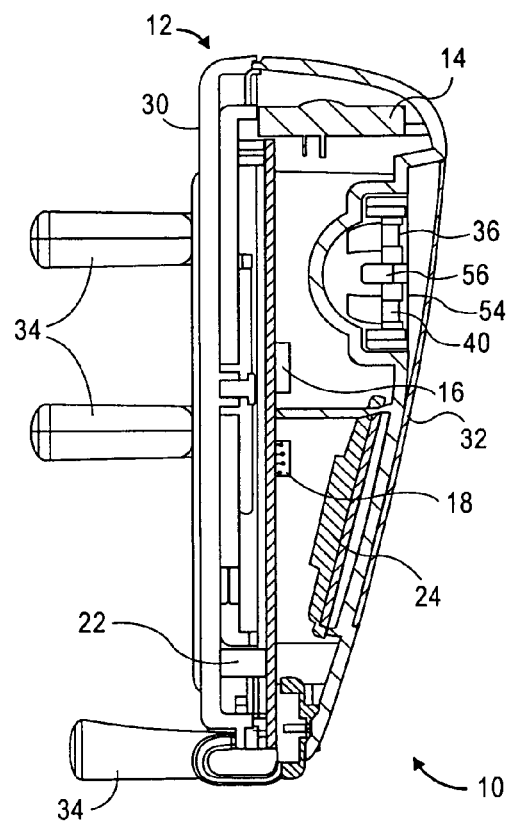
FIG. 2 is a cross-sectional view of the electronic device mount of FIG. 1.
Figure 7:
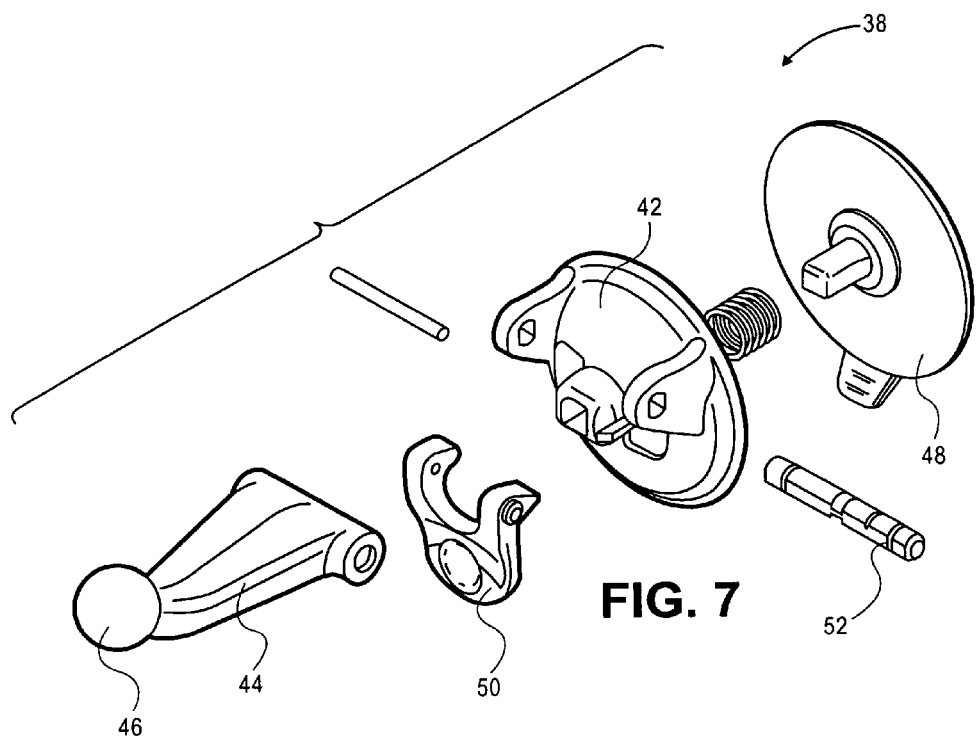
FIG. 7 is an exploded view of a mounting apparatus operable to be utilized by the electronic device mount of FIGS. 1-6.

As shown in FIGS. 2 and 7-8, the mounting element 36 preferably includes a base 38 operable to removably couple with the surface and a socket assembly 40 operable to removably couple with the base 38. The base 38 and socket assembly 40 are substantially similar to the base and socket assembly disclosed in co-pending and commonly assigned U.S. patent application Ser. No. 11/304,836, filed Dec. 15, 2005, entitled "SEPARABLE BALL AND SOCKET ASSEMBLY FOR ELECTRONIC DEVICE MOUNTS", which is incorporated herein by reference.

The socket assembly 40 is preferably integral with the rear portion 32 of the housing 12 to enable the housing 12 to be pivoted and rotated by the user about the base 38 to achieve a desired position. However, in various embodiments the socket assembly 40 may be removably coupled with the housing 12 to enable the socket assembly 40 to be independently coupled with the base 38.

As shown in FIG. 7, the base 38 preferably includes a circular platform 42 operable to removably mount to the surface, an arm 44 extending from the platform 42, and a mounting ball 46 positioned on a distal end of the arm 44. The circular platform 42 may removably mount to the surface utilizing various methods and devices, such as by utilizing mating components, adhesive elements, hook and loop fasteners such as Velcro®, latches, etc. Preferably, the circular platform 42 removably mounts to the surface utilizing suction. For instance, the circular platform 42 may include a flexible sheet 48 for creating a vacuum-seal with the surface.

The circular platform 42 may additionally include a lever 50 coupled with the flexible sheet 48 to engage the sheet 48 to facilitate suction mounting of the base 38 to the surface. The flexible sheet 48 may also include a tab to facilitate removal of the base 38 from the surface by breaking the vacuum seal between the flexible sheet 48 and the surface.

The arm 44 extends from the platform 42 to facilitate coupling with the socket assembly 40. Preferably, the arm 44 is rotatably coupled with the platform 42 to enable the arm 44 to rotate with respect to the base 38. The arm 44 may be rotatably coupled with the circular platform 42, or other portions of the base 38, utilizing various devices and methods, such as hinges, pivoting elements, flexible elements, etc. For instance, the circular platform 42 may include a raised axle 52 around which the arm 44 is operable to pivot.

The rotatable coupling of the arm 44 and the platform 42 preferably enables the arm 44 to be rotated by a user when force is applied but resists rotation of the arm 44 relative to the base 38 in the absence of user applied force. Thus, friction is preferably provided between the arm 44 and the circular platform 42, such as by having the axle 52 fit snugly through the arm 44 or by utilizing a hinge having resistive properties, to prevent inadvertent movement of the arm 44.

The ball 46 is positioned at the distal end of the arm 44 opposite the circular platform 42. The ball 46 may be integral with the arm 44 to facilitate formation of the arm 44 or the ball 46 may be removable from the arm 44, such as where a plurality of balls are provided to conform to various socket assemblies.

The ball 46 is preferably substantially rigid to prevent deformation thereof and presents an outer surface that introduces sufficient friction between the ball 46 and the socket assembly 40 to resist movement of the electronic device D relative to the base 38. The ball 46 may be constructed of plastic or another sturdy material that presents a rough surface, or may be coated to present a rough or soft surface with the friction characteristics described above.

The socket assembly 40 preferably removably couples with the base 38 by receiving and frictionally engaging at least a portion of the ball 46. In various embodiments the socket assembly 40 includes a seat 54 positioned at least partially within an orifice and operable to receive at least a portion of the ball 46.

Preferably, the seat 54 includes a plurality of interconnected arms 56. The arms 56 preferably substantially conform to the outer surface of the ball 46 to enable receipt of the ball 46, removably and rotatably couple the socket assembly 40 to the base 38, and frictionally resist rotation of the ball 46 relative to the seat 54.

In various embodiments, the housing 12 additionally includes a housing portion 58 formed between the front portion 30 and the rear portion 32. Thus, the volume between the front portion 30 and the rear portion 32 generally defines the housing portion 58. As shown in FIGS. 1 and 2, the housing portion 58 provides an area for housing and retaining the various mount 10 elements, including the antenna 14, processor 18, transmitter 16, etc. As should be appreciated, the housing portion 58 may be operable to house any element, including portions of the arm 44, posts 34, etc.

Figure 4:
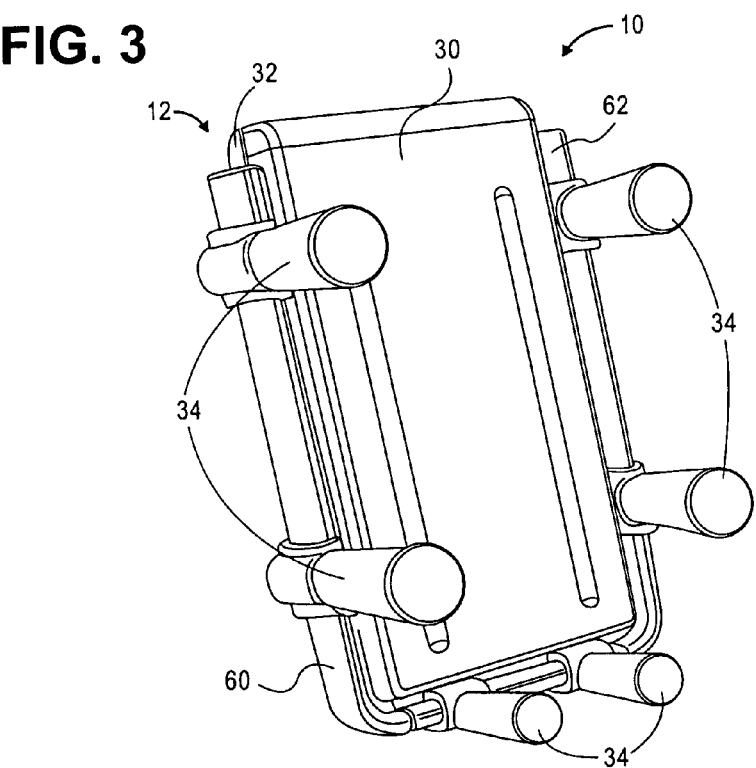
FIG. 4 is a perspective view of an alternative embodiment of the electronic device mount of FIGS. 1-3.

As shown in FIG. 4, various embodiments may lack the housing portion 58. Such a configuration enables the mount 10 to present a more compact profile. In order to achieve the compact profile, some embodiments of the present invention may lack the antenna 14, the processor 18, the transmitter 16, the memory 20, the microphone 22, the speaker 24, the coupling element 26, and/or the power source 28. For example, some embodiments of the mount 10 may include only the front portion 30, the rear portion 32, and the posts 34.

The posts 34 are positioned around at least a portion of the periphery of the front portion 30 to retain the electronic device. For example, the posts 34 may be positioned around three sides of the front portion 30, such as the left, right, and bottom, to enable the electronic device D to be securely retained therein.

Preferably, the posts 34 are spring-biased to further facilitate securely retaining the electronic device D. The posts 34 may be directly spring-biased through direct coupling with spring elements, such that insertion of the electronic device D between the posts 34 forces the posts 34 against the spring elements and generates a holding force to retain the electronic device D.

More preferably, the posts 34 are indirectly spring-biased through the utilization of a first slide 60, a second slide 62, and a spring element 64 coupled with both slides 60, 62 to bias the slides 60, 62 towards each other. At least one of the posts 34 is coupled with each slide 60, 62. The first slide 60 is positioned in proximity to a first side 66 of the front portion 30 and the second slide is positioned in proximity to a second side 68 of the front portion 30. Preferably, the slides 60, 62 are positioned in proximity to opposite sides of the front portion 30, such as a left and right side, but the slides 60, 62 may positioned in proximity to non-opposed sides of the front portion 30, such as a left side and a bottom side.

As shown in FIGS. 5-6, the slides 60, 62 are preferably positioned at least partially between the front portion 30 and the rear portion 32 for sliding therebetween. However, the slides 60, 62 may be positioned anywhere in proximity to the front portion 30, including in front of the front portion 30, behind the rear portion 32, entirely to the sides of the front portion 30, etc.

Figure 3:
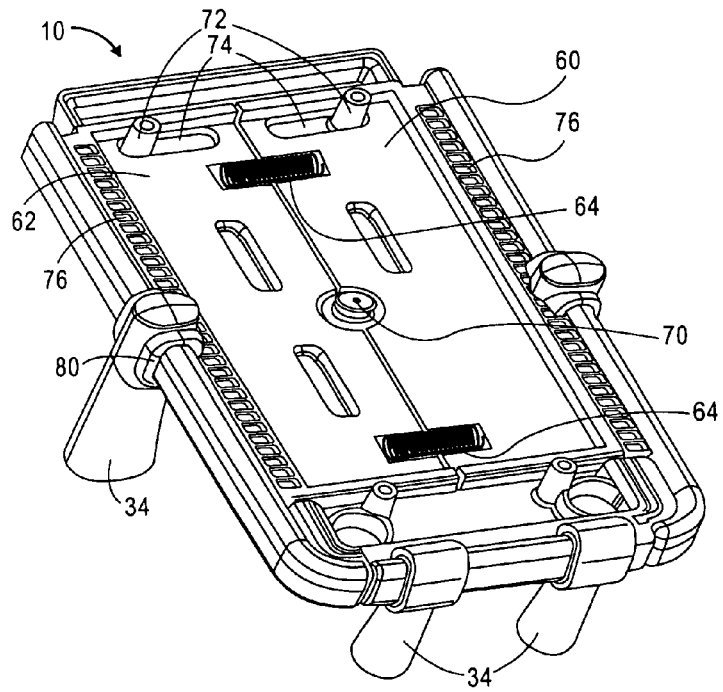
FIG. 3 is a rear-sectional view of the electronic device mount of FIGS. 1-2.

As shown in FIG. 3, the spring element 64 may include more than one spring or other resistive element coupled to each slide 60, 62. As the slides 60, 62 are pulled apart by the user, the spring element 64 biases the slides 60, 62 towards each other. To facilitate sliding and biasing of the slides 60, 62, the mount 10 may additionally include a cam 70 coupled to each slide. The cam 70 functions in a substantially conventional manner to enable symmetrical movement of the slides 60, 62. Thus, even if a force is applied to only one of the slides 60, 62, the cam 70 imparts an equal force to both slides 60, 62 to move the slides jointly. Such a configuration facilitates use of the mount 10 in automobiles and other mobile environments as the user may be unable the grasp the mount with two hands to pull each slide 60, 62 apart while driving.

In various embodiments, the front portion 30 includes one or more projections 72 extending therefrom and each slide 60, 62 may include one or more apertures 74 for receiving the projections 72. The projections 72 and apertures 74 limit the extent that the slides 60, 62 may be slid away from and towards each other, as shown in FIG. 3. For example, the area provided by the apertures 74 limits the amount the projections 72 may slide within each aperture, and thereby limits the amount the slides 60, 62, may slide in relation to the housing 12.

The posts 34 may be fixedly attached to various portions of the slides 60, 62, such as the periphery edges of the slides 60, 62, to provide appropriate contact with the electronic device D. Thus, one or more of the posts 34 may be integral with one of the slides 60, 62. However, the posts 34 are preferably repositionably coupled with the slides 60, 62 to enable the user to position the posts 34 on the slides 60, 62 in a desired manner. Thus, in various embodiments the posts 34 may be detachable from the slides 60, 62, slidable on the slides 60, 62, rotatable on the slides 60, 62, etc.

Utilizing repositonable posts 34 is preferable as it enables the mount 10 to conform to electronic devices having varying shapes, button configurations, and interfaces. For example, cellular phones often include important functional inputs on their sides, such that it would be disadvantageous if one of the posts 34 blocked, covered, or depressed the important functional inputs when the phone is retained by the mount 10. As cellular phones, and other electronic devices, present innumerable different configurations, it may be difficult or impossible to provide a static post configuration that interfaces appropriately with every conceivable electronic device configuration. Thus, by enabling the user to reposition and configure the posts 34, the user may position the posts 34 in any manner that securely retains the electronic device D without obstructing use of the electronic device D, regardless of the particular configuration of the electronic device D. For instance, the user may position the posts 34 around the electronic device's side buttons or displays to provide unobstructed access to the electronic device D.

Figure 10:
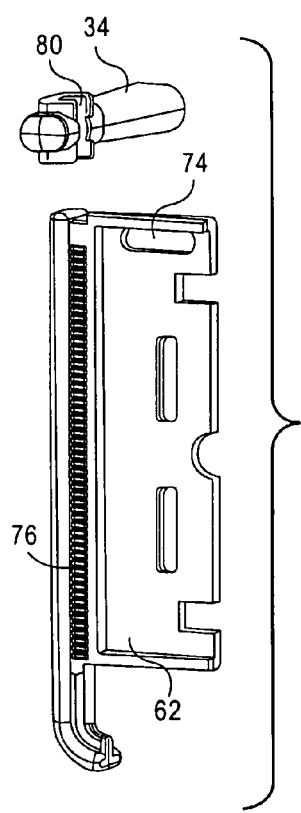
FIG. 10 is a perspective view of a post and a slide operable to be utilized by the electronic device mount of FIGS. 1-9.
Figure 11:
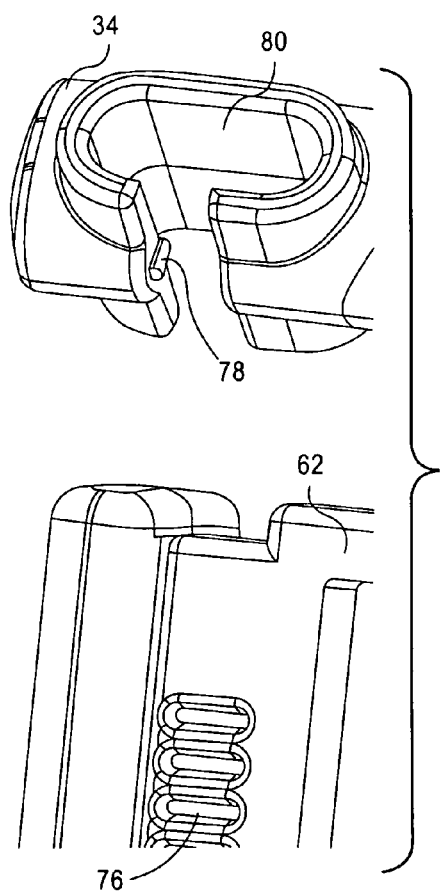
FIG. 11 is another perspective view of the post and slide of FIG. 10.

As shown in FIGS. 10 and 11, each slide 60, 62 preferably includes a plurality of parallel grooves 76 arranged along at least one of its sides to repositionably interface with one or more of the posts 34. Specifically, each of the posts 34 may include a protrusion 78 operable to repositonably mate with one of the grooves 76. The posts 34 may be positioned on the slides 60, 62 by applying force to each post 34 to cause the protrusions 78 to enter and exit one or more of the grooves 76. Once the post 34 is in the appropriate position, and the user no longer applies force, the protrusion 78 is retained within the groove 76 to retain the post 34 at the desired position. The user may apply additional force to the posts 34 to easily reposition them.

Preferably, each of the posts 34 additionally includes an arcuate portion 80 operable to at least partially envelop a rail of one of the ends of the slides 60, 62 as shown in FIG. 1. The arcuate portion 80 facilitates the secure coupling of each of the posts 34 to the slides 60, 62 by restricting the movement of each of the posts 34 in two dimensions along the rail of the slides 60, 62. Specifically, the arcuate portion 80 prevents the posts 34 from rotating, pivoting, or inadvertently disengaging from the rails of the slides 60, 62 by generally limiting the movement of each post 34 to a direction parallel to the rails. Thus, the arcuate portion 80, in combination with the rails, protrusion 78 and grooves 76, ensures that the posts 34 are not accidentally or inadvertently detached or repositioned.

In addition to the arcuate portion 80 and protrusion 78, each of the posts 34 preferably includes a device engaging portion 82. The device engaging portion 82 is operable to directly contact the electronic device D to securely retain the electronic device D within the mount 10. The device engaging portion 82 may present any shape or profile, including cylindrical and rectangular shapes.

Figures 12, 13:
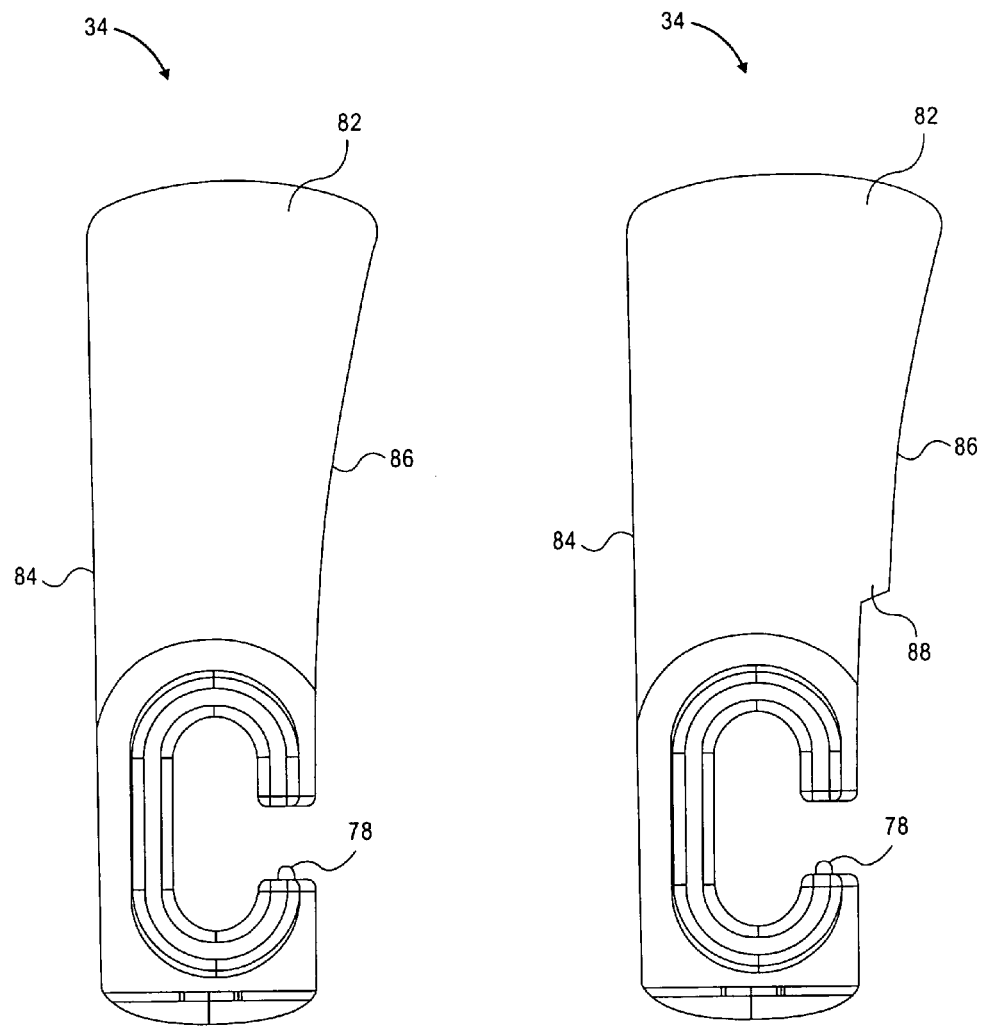
FIG. 12 is a top view of the post of FIGS. 10-11.
FIG. 13 is a top view off an alternative embodiment of a post that may be utilized by the electronic device mount of FIGS. 1-11.
Figure 14:
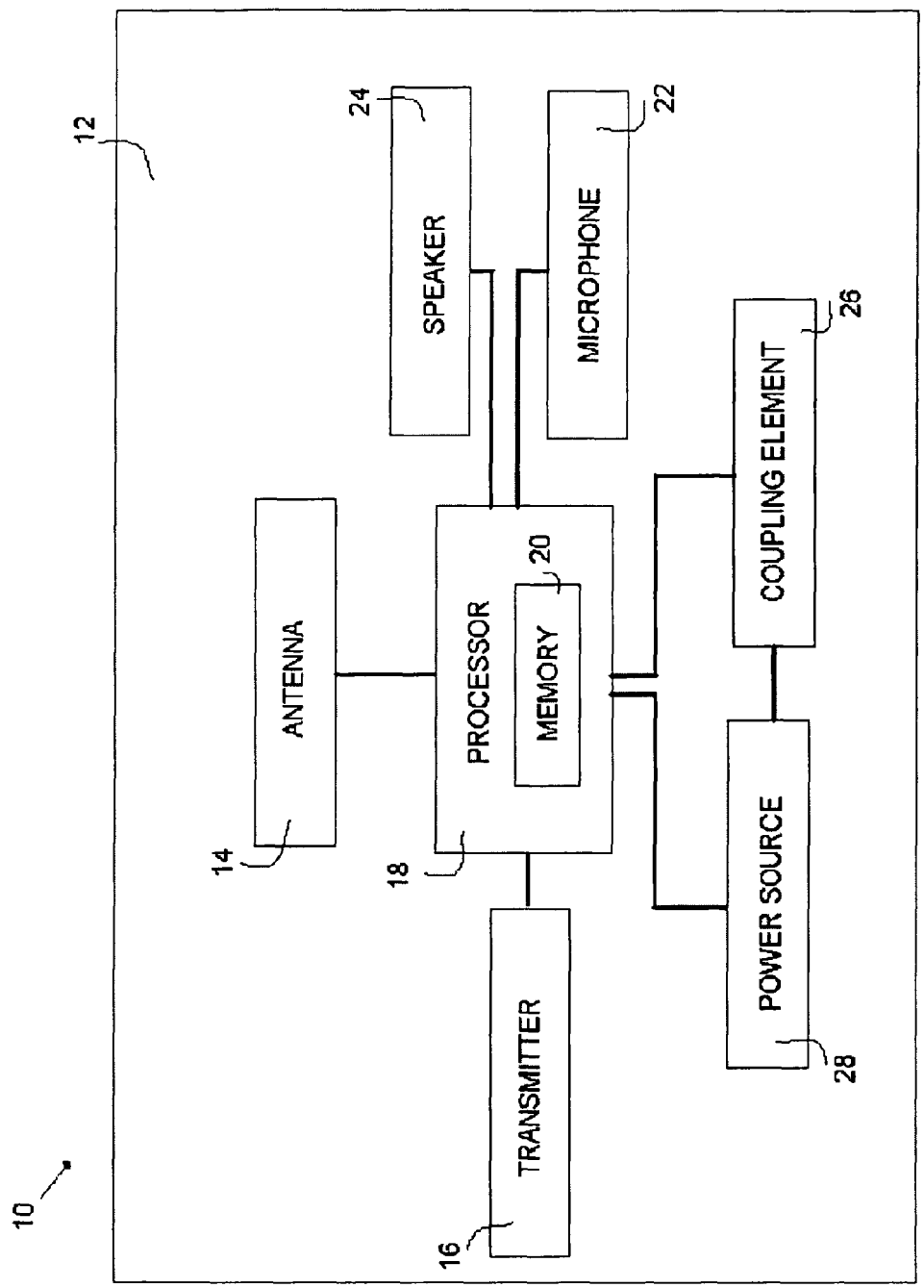
FIG. 14 is a block diagram showing some of the elements that may be utilized by the electronic device mount of FIGS. 1-10.

Preferably, the device engaging portion 82 includes an outer wall 84 and an inner wall 86 opposed to the outer wall 84. The inner wall 86 is operable to contact the electronic device D and the outer wall 84 generally defines one end of the mount 10. Preferably, the inner wall 86 is curved inwardly and away from the outer wall 84 at its distal end to facilitate coupling with the electronic device D, as shown in FIG. 12. Such curvature further facilitates secure mounting of the electronic device D as it generally prevents the electronic device D from disengaging from the mount 10 when the posts 34 are biased against the device D. Thus, the curvature of the device engaging portion 82 requires the slides 60, 62 to be slid apart from each other to remove the device D from the mount 10.

As shown in FIG. 13, in some embodiments the inner wall 86 may include an offset portion 88 substantially spaced away from other portions of the inner wall 86. Utilization of the offset portion 88 may be desirable in some embodiments as it enables the mount 10 to securely retain small electronic devices. Specifically, the offset portion 88 enables the posts 34 to retain the electronic device D even when the slides 60, 62 are not extended from each other, due to the extension of the offset portion 88 towards the center of the mount 10. However, as should be appreciated by those skilled in the art, the posts 34 may present any configuration operable to engage the electronic device D and need not be limited to the illustrations of FIGS. 12 and 13.

In operation, the user positions the mount 10 at a desired location, such as an automobile windshield, by utilizing the mounting element 36. For example, in embodiments where the mounting element 36 includes the base 38 and socket assembly 40, the user may attach the base 38 to the windshield and then attach the housing 12 to the base 38 by coupling the socket assembly 40 with the ball 46. After positioning the base 38 in the appropriate location, the user may provide power to the mount 10 by, for example, coupling the power source 28 with the automobile cigarette lighter socket. After, or before, mounting the mount 10 to the desired location, the electronic device D may be coupled with the mount 10, such as by utilizing the various secure fasteners discussed above.

Preferably, the user retains the electronic device D by positioning the device D between the posts 34. In embodiments where the posts 34 are coupled with the slides 60, 62, the user applies force to at least one of the slides 60, 62 to extend the slides 60, 62 apart from each other and increase the distance between the various posts 34 (as shown in FIG. 5), inserts the electronic device between the posts 34, and reduces the amount of force applied to the slides 60, 62, or stops applying force to slides 60, 62, to cause the slides 60, 62 to retract towards their initial position due to the force applied by the spring element 64 (as shown in FIG. 6). The posts 34 retract towards each other until they contact the electronic device D. The force provided by the spring element 64 causes at least some of the posts 34 to apply a constant holding force to the electronic device D to securely retain the device D.

To provide navigation information to the electronic device D, the mount 10 may continuously transmit navigation information utilizing the transmitter 16. Thus, for example, any electronic device in range of the mount 10 may receive navigation information therefrom, and not just the particular device securely retained by the mount 10. However, in some embodiments the mount 10 may only transmit navigation information when instructed to by the user, such as by the user depressing a functionable input positioned on the housing 12 or electronic device D, only when the electronic device D is retained by the mount 10, when instructed by a signal received through the transmitter 16, etc. As discussed above, the user may provide audio information to the electronic device D by functioning an input on the mount 10 or the electronic device D, or automatically by speaking in proximity to the mount 10 in a similar manner to conventional hands-free communication devices. Utilizing the transmitter 16, the mount 10 may simultaneously transmit both navigation information and audio information to the device D.

Although the invention has been described with reference to the preferred embodiment illustrated in the attached drawing figures, it is noted that equivalents may be employed and substitutions made herein without departing from the scope of the invention as recited in the claims. For instance, the mount 10 of the present invention may retain any device to wirelessly provide information thereto, and need not be limited to providing navigation information to navigation devices.

Having thus described the preferred embodiment of the invention, what is claimed as new and desired to be protected by Letters Patent includes the following:

1. A mount operable to removably couple an electronic device to a surface, the mount comprising:
    an antenna operable to receive a navigation signal;
    a processor coupled with the antenna and operable to generate navigation information utilizing the received navigation signal;
    a transmitter coupled with the processor and operable to wirelessly transmit the generated navigation information to the electronic device; and
    a housing to house at least a portion of the processor and the transmitter, the housing operable to securely retain the electronic device and couple with the surface, wherein the generated navigation information is selected from the group consisting of a current geographic location of the mount, a previous geographic location of the mount, a speed of the mount, a distance traveled by the mount, a route, a map corresponding to a determined geographic location, and combinations thereof.

2. The mount of claim 1, wherein the received navigation signal corresponds to a Global Positioning System (GPS) signal.

3. The mount of claim 1, wherein the transmitter is operable to wirelessly transmit the generated navigation information to the electronic device utilizing a Bluetooth protocol.

4. The mount of claim 1, further including a microphone and a speaker each coupled with the processor.

5. The mount of claim 4, wherein the transmitter is operable to wirelessly transmit audio information corresponding to sound received by the microphone to the electronic device.

6. The mount of claim 4, wherein the transmitter is operable to wirelessly receive audio information from the electronic device and the speaker is operable to generate sound corresponding to the received audio information.

7. The mount of claim 1, wherein the electronic device is selected from the group consisting of a cellular phone, a personal digital assistant (PDA), and a portable entertainment device.

8. The mount of claim 1, wherein the mount further includes-
    a coupling element operable to electrically couple the mount and the electronic device, and
    a power source operable to provide electrical power to the electronic device through the coupling element.

9. The mount of claim 1, wherein the transmitter is operable for bi-directional communication with the electronic device.

10. A mount operable to removably couple an electronic device to a surface, the mount comprising:

an antenna operable to receive a navigation signal;
a processor coupled with the antenna and operable to generate navigation information utilizing the received navigation signal;
a transmitter coupled with the processor and operable to wirelessly transmit the generated navigation information to the electronic device; and
a housing to house at least portions of the processor and the transmitter, the housing including:
a front portion,
a rear portion generally opposed to the front portion, the rear portion including a mounting element operable to couple with the surface, and
a plurality of spring-biased posts positioned around a least a portion of the periphery of the front portion and operable to securely retain the electronic device, wherein the generated navigation information is selected from the group consisting of a current geographic location of the mount, a previous geographic location of the mount, a speed of the mount, a distance traveled by the mount, a route from the mount to a desired geographic location, a map corresponding to a determined geographic location, and combinations thereof.

11. The mount of claim 10, wherein the mounting element includes a socket assembly to enable the mount to be rotatably coupled with the surface.

12. The mount of claim 10, wherein the received navigation signal corresponds to a Global Positioning System (GPS) signal.

13. The mount of claim 10, wherein the transmitter is operable to wirelessly transmit the generated navigation information to the electronic device utilizing the Bluetooth protocol.

14. The mount of claim 10, further including a microphone and a speaker each coupled with the processor.

15. The mount of claim 14, wherein the transmitter is operable to wirelessly transmit audio information corresponding to sound received by the microphone to the electronic device.

16. The mount of claim 14, wherein the transmitter is operable to wirelessly receive audio information from the electronic device and the speaker is operable to generate sound corresponding to the received audio information.

17. The mount of claim 14, wherein the mount further includes
coupling element operable to electrically couple the mount and the electronic device, and
a power source operable to provide electrical power to the electronic device through the coupling element.

18. A mount operable to removably couple an electronic device to a surface, the mount comprising:
an antenna operable to receive a Global Positioning System (GPS) signal;
a processor coupled with the antenna and operable to generate navigation information utilizing the received signal, wherein the generated navigation information is selected from the group consisting of a current geographic location of the mount and a speed of the mount;
a Bluetooth transmitter coupled with the processor and operable to wirelessly transmit the generated navigation information to the electronic device, wherein the transmitter is further operable to transmit and receive audio information to and from the electronic device; and
a housing to house at least portions of the processor and the transmitter, the housing Including-a
microphone and a speaker each coupled with the processor to receive and produce the audio information,
a front portion,
a rear portion generally opposed to the front portion, the rear portion including a mounting element to enable the mount to be coupled with the surface, and
a plurality of spring-biased posts positioned around a least a portion of the periphery of the front portion and operable to securely retain the electronic device.

* * * * *